United States Patent
Kageyama et al.

(10) Patent No.: US 12,392,274 B2
(45) Date of Patent: Aug. 19, 2025

(54) VEHICLE COOLING DEVICE

(71) Applicant: Mazda Motor Corporation, Hiroshima (JP)

(72) Inventors: Keitaro Kageyama, Aki-gun (JP); Shinichi Hikitani, Aki-gun (JP); Tomohiro Koguchi, Aki-gun (JP); Yukio Jo, Aki-gun (JP); Daisuke Shimo, Aki-gun (JP); Masahiro Miyazaki, Aki-gun (JP); Daisuke Fukuda, Aki-gun (JP); Akira Tsuda, Aki-gun (JP); Kenji Tanaka, Aki-gun (JP); Kazufumi Kumakura, Aki-gun (JP); Hiroaki Gotan, Aki-gun (JP); Takahiro Okazaki, Aki-gun (JP); Kenta Honda, Aki-gun (JP); Yoshie Kakuda, Aki-gun (JP); Toshiaki Tohoda, Aki-gun (JP); Kenta Kobayashi, Aki-gun (JP); Aki Murai, Aki-gun (JP); Masaki Yamamoto, Aki-gun (JP); Michiyuki Miura, Hiroshima (JP); Yusaku Takahashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/410,176

(22) Filed: Jan. 11, 2024

(65) Prior Publication Data
US 2024/0254911 A1    Aug. 1, 2024

(30) Foreign Application Priority Data
Jan. 30, 2023 (JP) .................. 2023-012227

(51) Int. Cl.
*F01P 7/16* (2006.01)
*B60K 1/00* (2006.01)
(Continued)

(52) U.S. Cl.
CPC .............. *F01P 7/165* (2013.01); *B60K 11/02* (2013.01); *F01P 3/12* (2013.01); *F01P 3/20* (2013.01);
(Continued)

(58) Field of Classification Search
CPC ...... F01P 7/165; F01P 3/12; F01P 3/20; F01P 5/12; F01P 7/14; F01P 7/167;
(Continued)

(56) References Cited

U.S. PATENT DOCUMENTS

| 11,365,671 | B2 * | 6/2022 | Hikitani | ............... F28F 27/02 |
| 2013/0255599 | A1 * | 10/2013 | Jentz | .................. F01P 11/14 123/41.1 |

(Continued)

FOREIGN PATENT DOCUMENTS

| EP | 3885545 A1 | 9/2021 |
| EP | 3885548 A1 | 9/2021 |
| JP | 2021156310 A | 10/2021 |

OTHER PUBLICATIONS

European Patent Office, Extended European Search Report Issued in Application No. 24152512.0, Jul. 4, 2024, Germany, 7 pages.

*Primary Examiner* — Phutthiwat Wongwian
*Assistant Examiner* — Susan E Scharpf
(74) *Attorney, Agent, or Firm* — Alleman Hall & Tuttle LLP

(57) ABSTRACT

A cooling device of a vehicle is provided, which includes a transmission, a first coolant circuit where a first coolant which cools the internal combustion engine circulates, a second coolant circuit independent from the first coolant
(Continued)

circuit, where a second coolant which cools the electric drive system circulates, and a fluid circuit where fluid which lubricates and cools friction engagement elements in the transmission circulates. The fluid circuit includes a first heat exchanger which exchanges heat between the fluid and the first coolant, a second heat exchanger in-series with the first heat exchanger which exchanges heat between the fluid and the second coolant, a first adjuster which changes a flow rate of the fluid passing through the first heat exchanger, and a second adjuster which changes a flow rate of the fluid passing through the second heat exchanger.

14 Claims, 9 Drawing Sheets

(51) Int. Cl.
| | |
|---|---|
| *B60K 11/02* | (2006.01) |
| *F01P 3/12* | (2006.01) |
| *F01P 3/20* | (2006.01) |
| *F01P 5/12* | (2006.01) |
| *F01P 7/14* | (2006.01) |
| *F16H 57/04* | (2010.01) |

(52) U.S. Cl.
CPC ............... *F01P 5/12* (2013.01); *F01P 7/14* (2013.01); *F01P 7/167* (2013.01); *F16H 57/0413* (2013.01); *B60K 2001/003* (2013.01); *F01P 2007/146* (2013.01); *F01P 2050/24* (2013.01); *F01P 2060/045* (2013.01)

(58) Field of Classification Search
CPC ............. F01P 2007/146; F01P 2050/24; F01P 2060/045; B60K 11/02; B60K 2001/003; F16H 57/0413; F16H 57/0417; F16H 57/0435; F16H 57/0473; F16H 57/0475; F16H 57/0476
See application file for complete search history.

(56) References Cited

U.S. PATENT DOCUMENTS

| | | | | |
|---|---|---|---|---|
| 2013/0255603 | A1* | 10/2013 | Pursifull | F01P 11/16 |
| | | | | 123/41.15 |
| 2014/0000536 | A1* | 1/2014 | Glassford | F01P 7/14 |
| | | | | 236/34.5 |
| 2014/0352636 | A1* | 12/2014 | Glassford | F01P 7/165 |
| | | | | 123/41.08 |
| 2015/0059665 | A1* | 3/2015 | Quix | F16H 57/0413 |
| | | | | 123/41.02 |
| 2016/0363038 | A1* | 12/2016 | Kawamoto | F02M 26/30 |
| 2017/0198803 | A1* | 7/2017 | Tokozakura | F16H 57/04 |
| 2018/0038267 | A1* | 2/2018 | Murai | F01P 7/165 |
| 2018/0335130 | A1* | 11/2018 | Gooden | F16H 57/0413 |
| 2021/0301712 | A1* | 9/2021 | Hikitani | F01P 3/12 |
| 2021/0301768 | A1* | 9/2021 | Hikitani | B60K 6/40 |
| 2022/0063394 | A1* | 3/2022 | Uto | B60K 11/04 |
| 2022/0397053 | A1* | 12/2022 | Park | F01P 3/02 |

* cited by examiner

VEHICLE COOLING DEVICE

TECHNICAL FIELD

The art disclosed herein relates to a cooling device of a vehicle.

BACKGROUND

JP2021-156310A discloses a cooling device of a vehicle. A conventional cooling device is mounted on the vehicle provided with an internal combustion engine, an electric drive system, and a transmission. The conventional cooling device performs temperature management of the ATF (Automatic Transmission Fluid). The ATF lubricates and cools friction engagement elements inside the transmission.

In more detail, the cooling device includes an ATF circuit through which the ATF circulates, a first coolant circuit, and a second coolant circuit. The first coolant circuit is a circuit through which a first coolant for cooling the internal combustion engine circulates. The second coolant circuit is a circuit through which a second coolant for cooling the electric drive system circulates. The ATF circuit has a first heat exchanger and a second heat exchanger which is arranged in series with the first heat exchanger. The first heat exchanger exchanges heat between the ATF and the first coolant. The second heat exchanger exchanges heat between the ATF and the second coolant. Since the conventional cooling device uses the two heat exchangers, it is advantageous for cooling of the ATF.

Further, the ATF circuit of the conventional cooling device has a thermostat valve. The thermostat valve adjusts a flow rate of the ATF which passes through the second heat exchanger according to the temperature of the ATF. In more detail, the ATF circuit has a bypass passage which bypasses the second heat exchanger. The thermostat valve increases a passing flow rate through the second heat exchanger and decreases a passing flow rate through the bypass passage when the temperature of the ATF becomes high, and it decreases the passing flow rate through the second heat exchanger and increases the passing flow rate through the bypass passage when the temperature of the ATF becomes low. The conventional cooling device tends to maintain the ATF at a suitable temperature with the thermostat valve.

Meanwhile, if the transmission mounted on the vehicle is without a torque converter for the purpose of improvement in gear-shift response, improvement in gear-shift feel, and/or improvement in fuel/electricity efficiency, the transmission transmits torque when the vehicle starts moving by using the friction engagement elements (i.e., a clutch and/or a brake). The torque converterless transmission has a technical problem that the friction engagement elements tend to generate heat. Especially while traveling off-road or towing, the friction engagement elements easily reach high temperatures.

Since the conventional cooling device is capable of suppressing the ATF from reaching high temperatures by the two heat exchangers, it is advantageous for cooling of the friction engagement elements while traveling off-road or towing. However, the generation of heat of the friction engagement elements is suppressed during normal travel, and thereby, the temperature of the ATF becomes relatively low. The temperature drop of the ATF in the conventional cooling device may excessively lower the temperature of the first coolant inside the first heat exchanger. Since the temperature drop of the first coolant lowers the temperature of lubricant inside the internal combustion engine, it increases the friction loss of the internal combustion engine. That is, the conventional cooling device may lower the fuel efficiency of the internal combustion engine.

SUMMARY OF THE DISCLOSURE

The art disclosed herein maintains temperature of fluid for lubricating and cooling a transmission at a suitable temperature.

The art disclosed herein relates to a cooling device of a vehicle. The cooling device includes a transmission connected to an internal combustion engine and an electric drive system, and is configured to change a gear of an output of at least one of the internal combustion engine and the electric drive system and transfer the output to the driving wheel of the vehicle, a first coolant circuit through which a first coolant configured to cool the internal combustion engine circulates, a second coolant circuit independent from the first coolant circuit, through which a second coolant configured to cool the electric drive system circulates, and a fluid circuit through which fluid configured to lubricate and cool friction engagement elements in the transmission circulates. The fluid circuit includes a first heat exchanger configured to exchange heat between the fluid and the first coolant, a second heat exchanger that is arranged in series with the first heat exchanger, and configured to exchange heat between the fluid and the second coolant, a first adjuster configured to change a flow rate of the fluid passing through the first heat exchanger, and a second adjuster configured to change a flow rate of the fluid passing through the second heat exchanger.

The fluid circuit includes the two heat exchangers, the first heat exchanger and the second heat exchanger. The fluid for lubricating and cooling the transmission exchanges heat with the first coolant in the first heat exchanger, and exchanges heat with the second coolant in the second heat exchanger. By using the two heat exchangers, the cooling device can suppress the fluid from reaching high temperatures. For example, even in a case of a torque converterless transmission where the friction engagement elements of the transmission tend to generate heat, the cooling device can suitably cool the friction engagement elements by decreasing the temperature of the fluid.

The cooling device includes the second adjuster. For example, when the temperature of the fluid becomes high, the second adjuster increases the flow rate of the fluid passing through the second heat exchanger, and when the temperature of the fluid becomes low, the second adjuster decreases the flow rate of the fluid passing through the second heat exchanger. By adjusting the heat exchange between the fluid and the second coolant, the temperature of the fluid is suitably maintained.

The cooling device also includes the first adjuster. The first adjuster may change the flow rate of the fluid passing through the first heat exchanger according to the temperature of the fluid.

When the temperature of the fluid is low (e.g., when the vehicle is cold), the first adjuster may increase the flow rate of the fluid passing through the first heat exchanger so that the temperature of the fluid is increased due to the heat of the internal combustion engine. The early temperature rise of the fluid results in a decrease in viscosity of the fluid, which reduces resistance of the transmission. Therefore, it is advantageous for improvement in the fuel and/or the electricity efficiency of the vehicle.

When the temperature of the fluid is high (e.g., off-road travel or towing of the vehicle), the first adjuster may make the flow rate of the fluid passing through the first heat exchanger smaller so that the temperature of the fluid decreases. The temperature decrease of the fluid suppresses an excessive heat generation of the friction engagement elements of the transmission.

When the temperature of the fluid is intermediate (e.g., normal travel of the vehicle), the first adjuster may decrease the flow rate of the fluid passing through the first heat exchanger. During the normal travel of the vehicle, heat generation of the friction engagement elements of the transmission is relatively low. Thus, the demand for cooling the fluid is low. Further, if heat exchange between the middle-temperature fluid and the first coolant results in an excessive temperature decrease of the first coolant, viscosity of lubricant inside the internal combustion engine increases, which increases the friction loss of the internal combustion engine. By suppressing the heat exchange between the middle-temperature fluid and the first coolant, the excessive temperature decrease of the first coolant is suppressed, and the increase in the friction loss of the internal combustion engine is suppressed. Therefore, the fuel efficiency of the internal combustion engine is not deteriorated.

The first adjuster may change the flow rate of the fluid passing through the first heat exchanger, independently from the passing flow rate of the fluid through the second heat exchanger.

By changing the passing flow rate through the first heat exchanger independently from the passing flow rate through the second heat exchanger, the cooling device provided with the two heat exchangers can realize suitable maintenance of the temperature of the fluid.

The fluid circuit may further include a first bypass passage bypassing the first heat exchanger. The first adjuster may be connected to a controller, and may change a ratio of the flow rate of the fluid passing through the first heat exchanger and a flow rate of the fluid passing through the first bypass passage based on a signal from the controller.

By using the first bypass passage, the first adjuster can change the passing flow rate through the first heat exchanger while maintaining a constant circulating flow rate in the fluid circuit. Further, unlike a thermostat valve, the first adjuster changes the flow rate of the fluid passing through the first bypass passage based on the signal from the controller. The first adjuster can change the flow rate of the fluid passing through the first bypass passage according to, for example, the temperature of the fluid, the temperature of the first coolant, and/or the temperature of the second coolant. Note that the first adjuster may make the flow rate of the fluid passing through the first heat exchanger to be zero. The first adjuster may make the flow rate of the fluid passing through the first bypass passage to be zero.

When the temperature of the fluid is below a first temperature, the controller may output an energization signal to the first adjuster to make the flow rate of the fluid passing through the first heat exchanger larger. When the temperature of the fluid is above the first temperature, the controller may stop the energization signal to the first adjuster to make the flow rate of the fluid passing through the first heat exchanger smaller than the flow rate when the temperature is below the first temperature.

The case where the temperature of the fluid is below the first temperature corresponds to cold operation of the transmission, for example. When the temperature of the fluid is below the first temperature, the internal combustion engine and/or the electric drive system may also be in cold operation. By making the flow rate of the fluid passing through the first heat exchanger larger when the temperature of the fluid is below the first temperature, the temperature of the fluid can be increased promptly using the heat of the internal combustion engine. The temperature rise of the fluid for lubricating the transmission reduces the resistance of the transmission, resulting in improvement in the fuel efficiency and/or the electricity efficiency of the vehicle.

The case where the temperature of the fluid is above the first temperature corresponds to the hot operation of the transmission and during normal travel of the vehicle. In such a case, the heat generation of the friction engagement elements of the transmission is suppressed. By decreasing the flow rate of the fluid passing through the first heat exchanger, the temperature of the first coolant decreasing excessively can be suppressed. Since the increase in the friction loss of the internal combustion engine is suppressed, the fuel efficiency of the internal combustion engine is not deteriorated. Further, when the temperature of the fluid is above the first temperature, the fluid is at a suitable temperature. Thus, the decreased flow rate of the fluid passing through the heat exchanger suppresses an excessive temperature rise of the fluid. The lubricating performance of the transmission decreasing due to an excessive viscosity decrease of the fluid for lubrication is suppressed. Further, by stopping the energization signal to the first adjuster when the heat exchange in the first heat exchanger is unnecessary, the fuel efficiency and/or the electricity efficiency of the vehicle improve.

When the temperature of the fluid is above a second temperature (here, the second temperature>the first temperature), the controller may output the energization signal to the first adjuster to make the flow rate of the fluid passing through the first heat exchanger larger than the flow rate when the temperature is above the first temperature and below the second temperature.

The case where the temperature of the fluid is above the second temperature corresponds to a case where the friction engagement elements of the transmission tend to generate heat during traveling off-road or towing, for example. By increasing the flow rate of the fluid passing through the first heat exchanger when the temperature of the fluid is above the second temperature, the temperature of the fluid is decreased. Therefore, excessive heat generation of the friction engagement elements is suppressed.

When the temperature of the fluid is above the second temperature and temperature of the first coolant is above the third temperature (here, the third temperature<the second temperature, the third temperature≥the first temperature), the controller may output the energization signal to the first adjuster to increase the flow rate of the fluid passing through the first heat exchanger. When the temperature of the fluid is above the second temperature and the temperature of the first coolant is below the third temperature, the controller may stop the energization signal to the first adjuster to make the flow rate of the fluid passing through the first heat exchanger smaller than the flow rate when the temperature is above the third temperature.

The case where the temperature of the fluid is above the second temperature and the temperature of the first coolant is above the third temperature corresponds to the case where the friction engagement elements of the transmission tend to generate heat when traveling off-road or towing, as described above. In such a case, by increasing the flow rate of the fluid passing through the first heat exchanger, the heat exchange in the first heat exchanger is stimulated. It is advantageous to decrease the temperatures of the fluid and the first coolant. The excessive heat generation of the friction engagement elements during traveling off-road or towing is suppressed. Further, the internal combustion engine is suitably cooled during traveling off-road or towing.

When the temperature of the fluid is above the second temperature and the temperature of the first coolant is below the third temperature, by decreasing the flow rate of the fluid passing through the first heat exchanger, the temperature of the fluid can be maintained at a suitable temperature. The case where the temperature of the fluid is above the second temperature and the temperature of the first coolant is below the third temperature also corresponds to the case where the friction engagement elements of the transmission tend to generate heat during traveling off-road or towing, as described above. However, when the temperature of the fluid is above the second temperature, the heat exchange between the fluid and the first heat exchanger occurs excessively. By decreasing the flow rate of the fluid passing through the first heat exchanger, the temperature of the internal combustion engine can be maintained suitably.

When the temperature of the fluid is above the first temperature and below the second temperature, and the temperature of the first coolant is above a fourth temperature (here, the fourth temperature>the third temperature, the fourth temperature≈the second temperature), and when temperature of the second coolant is below a fifth temperature, the controller may output the energization signal to the first adjuster to make the flow rate of the fluid passing through the first heat exchanger larger, and when the temperature of the second coolant is above the fifth temperature, the controller may stop the energization signal to the first adjuster to make the flow rate of the fluid passing through the first heat exchanger smaller than the flow rate when the temperature is below the fifth temperature.

When the temperature of the fluid is above the first temperature and below the second temperature, and the temperature of the first coolant is above the fourth temperature, since the temperature of the first coolant is higher than that of the fluid, heat moves from the first coolant to the fluid when heat exchange is performed in the first heat exchanger.

The temperature of the second coolant of the electric drive system tends to be influenced by ambient temperature. If the ambient temperature is high, the temperature of the second coolant tends to become high. If the temperature of the second coolant becomes above the fifth temperature, it is demanded to keep the temperature of the electric drive system from exceeding the allowable temperature due to the temperature by suppressing further rise of the temperature of the second coolant.

As described above, if heat exchange is performed in the first heat exchanger when the temperature of the fluid is above the first temperature and below the second temperature, and the temperature of the first coolant is above the fourth temperature, heat moves from the first coolant to the fluid. In such a case, if heat moves from the fluid to the second coolant in the second heat exchanger, a temperature rise of the second coolant may occur.

Thus, if the temperature of the second coolant is above the fifth temperature, the controller stops the energization signal to the first adjuster. The heat exchange in the first heat exchanger is suppressed. Since the heat transfer from the first coolant to the fluid is suppressed, the heat transfer from the fluid to the second coolant in the second heat exchanger is also suppressed. That is, the temperature rise of the second coolant is suppressed. For example, when the ambient temperature is high, it is suppressed the temperature of the electric drive system exceeds the allowable temperature.

When the temperature of the second coolant is below the fifth temperature, the controller outputs the energization signal to the first adjuster. In the first heat exchanger, heat moves from the first coolant to the fluid, and in the second heat exchanger, heat moves from the fluid to the second coolant. Since the heat inside the internal combustion engine moves to the second coolant through the fluid, the temperature decrease of the first coolant is stimulated. During towing, for example, the internal combustion engine is cooled efficiently.

Note that the fifth temperature may be determined according to the allowable temperature of the electric drive system. The fifth temperature may be, for example, a temperature between the third temperature and the fourth temperature.

The first coolant circuit may include a third adjuster configured to make, when the temperature of the first coolant is below the third temperature, the flow rate of the first coolant passing through the first heat exchanger smaller than the flow rate when the temperature is above the third temperature. When the temperature of the fluid is below the first temperature and the temperature of the first coolant is above the third temperature, the controller may output the energization signal to the first adjuster to make the flow rate of the fluid passing through the first heat exchanger larger. When the temperature of the fluid is below the first temperature and the temperature of the first coolant is below the third temperature, the controller may stop the energization signal to the first adjuster to make the flow rate of the fluid passing through the first heat exchanger smaller than the flow rate when the temperature is above the third temperature.

The case where the temperature of the first coolant is below the third temperature corresponds to the cold operation of the internal combustion engine. The third adjuster makes the flow rate of the first coolant passing through the first heat exchanger relatively small, and the heat exchange in the first heat exchanger is not substantially performed. Since the supply of the fluid to the first heat exchanger is not necessary, the controller stops the energization signal to the first adjuster. Stopping the energization signal to the first adjuster improves the fuel and/or electricity efficiency of the vehicle.

Further, since the heat exchange in the first heat exchanger is suppressed, the temperature rise of the first coolant is stimulated. Thus, early warming up of the internal combustion engine is realized.

The case where the temperature of the first coolant is above the third temperature corresponds to the hot operation of the internal combustion engine. The third adjuster increases the flow rate of the first coolant passing through the first heat exchanger. The controller also outputs the energization signal to the first adjuster to increase the flow rate of the fluid passing through the first heat exchanger. The low-temperature fluid receives the heat from the first coolant, and the temperature of the fluid promptly rises.

The fluid circuit may include a fluid pump for circulation connected to a shaft inside the transmission, and configured to be driven by rotation of the shaft. The controller may stop the energization signal to the first adjuster, when the fluid pump is stopped.

While the transmission is stopped, since the fluid pump also stops, the fluid does not circulate in the fluid circuit. Thus, it is advantageous to the improvement in the fuel and/or electricity efficiency of the vehicle to stop the energization signal to the first adjuster while the fluid pump is stopped.

The fluid circuit may further include a second bypass passage bypassing the second heat exchanger. The second adjuster may be a thermostat valve configured to change a ratio of a flow rate of the fluid passing through the second heat exchanger and a flow rate of the fluid passing through the second bypass passage according to the temperature of the fluid. When the temperature of the fluid is below the first temperature, the second adjuster may make the flow rate of the fluid passing through the second heat exchanger smaller. When the temperature of the fluid is above the first temperature, the controller may make the flow rate of the fluid passing through the second heat exchanger larger than the flow rate when the temperature is below the first temperature.

The case where the temperature of the fluid is below the first temperature corresponds to the cold operation of the transmission, for example, as described above. Since decreasing the flow rate of the fluid passing through the second heat exchanger suppresses the heat transfer from the fluid to the second coolant, it is advantageous for prompt temperature rise of the fluid, which is advantageous for reduction of resistance in the transmission.

The case where the temperature of the fluid is above the first temperature corresponds to the hot operation of the transmission, for example. It includes normal travel, traveling off-road, and/or towing. By increasing the flow rate of the fluid passing through the second heat exchanger, it becomes possible to maintain the temperature of the fluid at a suitable temperature.

DETAILED DESCRIPTION OF THE DISCLOSURE

Figure 1:
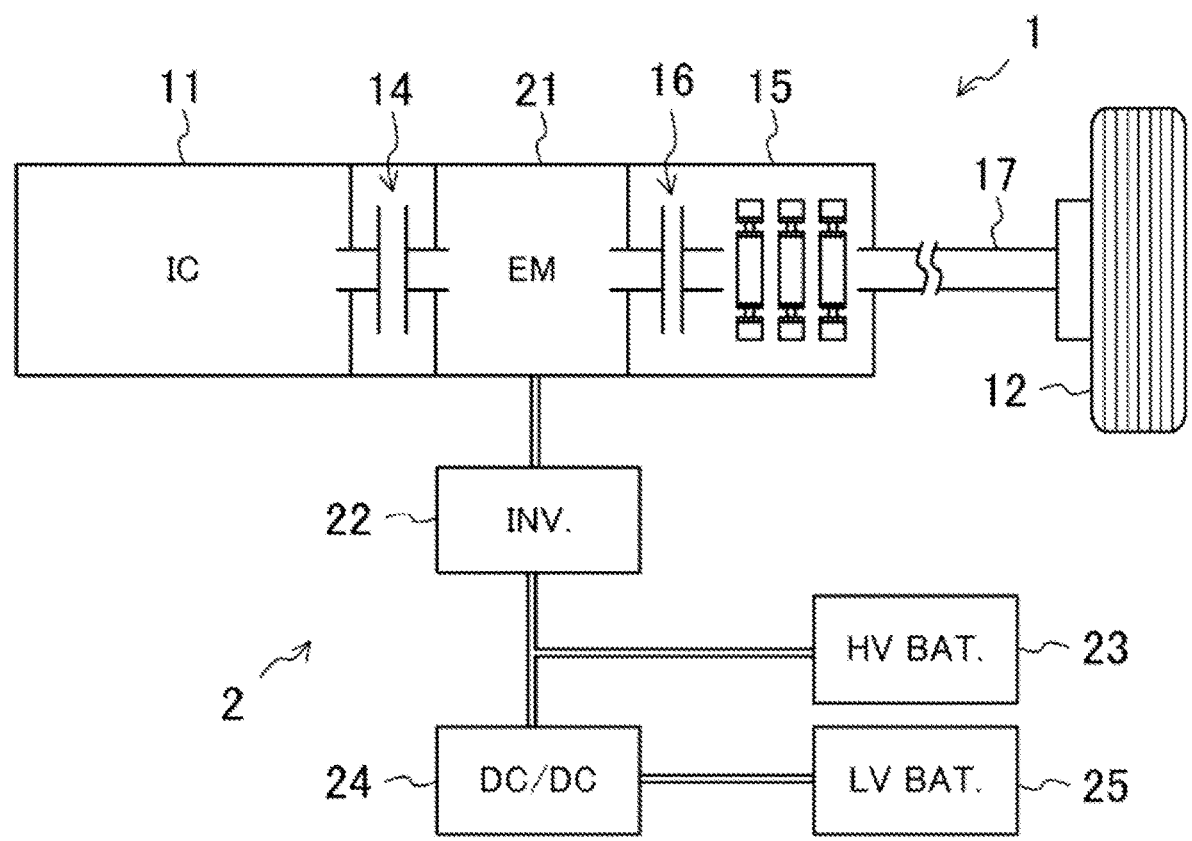
FIG. 1 illustrates a propelling system of a vehicle on which a cooling device is mounted.

Hereinafter, embodiments of a cooling device of a vehicle are described with reference to the accompanying drawings. The cooling device described herein is merely illustration.
(Overall Configuration of Vehicle)
FIG. 1 illustrates a propelling system of a vehicle 1. The vehicle 1 is a hybrid vehicle which is capable of traveling while being propelled by electric power.

An internal combustion engine 11 is mounted on the vehicle 1. The internal combustion engine 11 outputs torque for propelling the vehicle. The internal combustion engine 11 may be disposed, for example, at the front side of the vehicle body. Driving wheels 12 of the vehicle 1 may be rear wheels. The vehicle 1 may be a so-called "FR (front engine, rear wheel drive) vehicle." Note that the driving wheels 12 may alternatively be front wheels. In this case, the vehicle 1 may be a so-called "FF (front engine, front wheel drive) vehicle."

The internal combustion engine 11 is, for example, a compression ignition engine. The internal combustion engine 11 may alternatively be a spark ignition engine. The internal combustion engine 11 has a plurality of cylinders. Note that the number of cylinders is not limited to a specific number. The internal combustion engine 11 is an engine with a supercharger. The supercharger may alternatively be a turbocharger using exhaust energy. The internal combustion engine 11 has an intercooler 13 (see FIG. 2) which cools compressed intake air.

An electric drive system 2 is mounted on the vehicle 1. The electric drive system 2 has an electric motor 21. The electric motor 21 is a permanent-magnet synchronous motor which is driven, for example, by three-phase alternate current. The electric motor 21 is connected in series with the internal combustion engine 11 via a clutch 14. The electric motor 21 generates the torque for propelling the vehicle. The driving wheels 12 are driven by collaboration of the internal combustion engine 11 and the electric motor 21. The vehicle 1 travels as the driving wheels 12 are driven. Note that the electric motor 21 is used as a power generator for regeneration.

The electric motor 21 is connected with a high-voltage battery 23 via an inverter 22. The high-voltage battery 23 is a driving power source mounted on the vehicle 1. The high-voltage battery 23 supplies direct-current power at high voltage to the inverter 22. The inverter 22 converts the direct-current power into the three-phase alternate current, and supplies it to the electric motor 21. Therefore, the electric motor 21 rotates. Further, the electric motor 21 supplies regenerated energy to the high-voltage battery 23.

A DCDC converter 24 is connected to the high-voltage battery 23. The DCDC converter 24 converts high-voltage direct-current power into low-voltage direct-current power, and outputs the low-voltage direct-current power. The DCDC converter 24 is connected to a low-voltage battery 25. The DCDC converter 24 charges the low-voltage battery 25.

The electric motor 21, the inverter 22, the high-voltage battery 23, the DCDC converter 24, and the low-voltage battery 25, which are described above, are included in the electric drive system 2.

The clutch 14 intervenes between a shaft of the electric motor 21 and a crankshaft of the internal combustion engine 11. The clutch 14 changes between a state where the crankshaft and the motor shaft are coupled to each other (engaged state), and a state where the crankshaft and the motor shaft are decoupled from each other (disengaged state).

The shaft of the electric motor 21 is connected to an input shaft of a transmission 15 (described later). Therefore, the internal combustion engine 11 is coupled to the transmission 15 via the clutch 14 and the motor shaft. When the clutch 14 becomes in the disengaged state, the internal combustion engine 11 is disengaged from the transmission 15. In this case, the vehicle 1 can travel only by the torque of the electric drive system 2.

The transmission 15 is mounted on the vehicle 1. The transmission 15 changes gear of at least one of the output of the internal combustion engine 11 and the output of the electric drive system 2, and outputs it to the driving wheels 12. The transmission 15 is, for example, a multi-stage automatic transmission (so-called "AT"). The input shaft of the transmission 15 is coupled to the electric motor 21, as described above. The output shaft of the transmission 15 is connected with the driving wheels 12 via a power transmission member 17.

The transmission 15 has a transmission mechanism including a plurality of planetary gear mechanisms and a plurality of friction engagement elements. The friction engagement elements are a brake and/or a clutch, so to speak. The friction engagement elements changes between an engaged state and a disengaged state by hydraulic pressure. The transmission 15 selectively engages the plurality of friction engagement elements by a hydraulic pressure control. The gear stage of the transmission 15 changes to any one of forward-traveling gear stages from 1st gear to 8th gear, and a rearward-traveling gear stage (reverse gear).

The transmission 15 is a torque converterless transmission. The transmission 15 engages friction engagement elements 16 for starting the vehicle, for example, when starting movement of the vehicle 1. The friction engagement element 16 for starting the vehicle is one or more of the friction engagement elements described above. Note that the engagement of the friction engagement elements 16 also includes slipping of the friction engagement elements 16.

The vehicle 1 has an EV (Electric Vehicle) mode and an HEV (Hybrid Electric Vehicle) mode. The EV mode is a mode in which only the electric drive system 2 outputs the torque for propelling the vehicle 1. The HEV mode is a mode in which both the internal combustion engine 11 and the electric drive system 2 output the torque for propelling the vehicle 1.

(Cooling Device)

Figure 2:
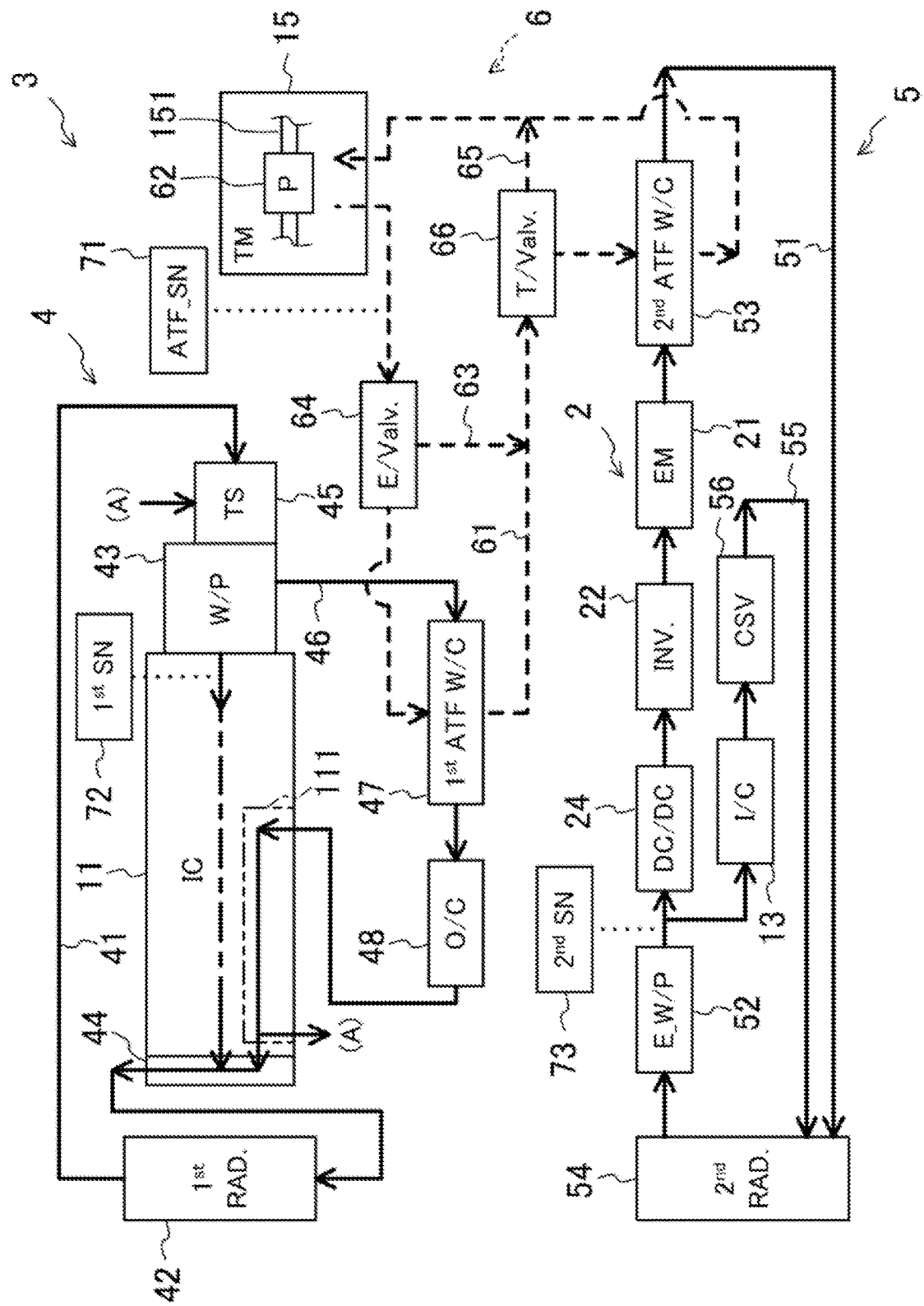
FIG. 2 is a circuit diagram of the cooling device.

FIG. 2 is a circuit diagram of a cooling device 3 mounted on the vehicle 1. The cooling device 3 manages temperature of the transmission 15. The cooling device 3 also performs temperature management of the internal combustion engine 11 and the electric drive system 2.

The cooling device 3 is provided with a first coolant circuit 4. The first coolant circuit 4 performs the temperature management of the internal combustion engine 11. In the first coolant circuit 4, a first coolant which cools the internal combustion engine 11 circulates.

The first coolant circuit 4 has a first passage 41. The flow direction of the first coolant in the first passage 41 is illustrated by the direction of a solid-line arrow. The first passage 41 connects the internal combustion engine 11 with a first radiator 42. The first passage 41 is connected to a mechanical water pump 43. The mechanical water pump 43 is attached to the internal combustion engine 11. The mechanical water pump 43 is coupled to the crankshaft of the internal combustion engine 11. The mechanical water pump 43 is driven by the internal combustion engine 11. When the mechanical water pump 43 is driven, the first coolant is introduced into the internal combustion engine 11. The first coolant receives heat from the internal combustion engine 11. The first coolant exits the internal combustion engine 11 from an outlet 44 attached to the internal combustion engine 11. The first coolant is fed to the first radiator 42 from the outlet 44 through the first passage 41. The first coolant radiates the heat into the atmosphere by the first radiator 42.

The first passage 41 is connected to a first thermostat valve 45. The first thermostat valve 45 is a valve which opens and closes according to the temperature of the first coolant. When the temperature of the first coolant reaches a valve-opening temperature, the first thermostat valve 45 opens the first passage 41. The valve-opening temperature is 50° C., for example. The first thermostat valve 45 may adopt a known structure which uses, for example, wax.

When the first passage 41 is opened by the first thermostat valve 45, the first coolant flows in order of the mechanical water pump 43, the internal combustion engine 11, the outlet 44, the first radiator 42, the first thermostat valve 45, and the mechanical water pump 43 to circulate through the first passage 41. The temperature of the first coolant is maintained at a given temperature to cool the internal combustion engine 11.

The first coolant circuit 4 also has a second passage 46. The second passage 46 is connected to the mechanical water pump 43. The flow direction of the first coolant in the second passage 46 is illustrated by the direction of a solid-line arrow.

The second passage 46 is connected to a first ATF (Automatic Transmission Fluid) warmer cooler 47. The first ATF warmer cooler 47 exchanges heat between the first coolant and the ATF, as will be described later. The first ATF warmer cooler 47 is one example of a first heat exchanger. The first ATF warmer cooler 47 may adopt various structures of known heat exchangers.

The second passage 46 is also connected to an oil cooler 48. The oil cooler 48 exchanges heat between the first coolant and lubricant of the internal combustion engine 11. The oil cooler 48 may also adopt various structures of known heat exchangers.

The second passage 46 is connected to the internal combustion engine 11. The second passage 46 is located at a location 111 near an exhaust port which becomes the highest temperature in the internal combustion engine 11. The second passage 46 branches into two. One side of the second passage 46 is connected to the outlet 44. The first passage 41 and the second passage 46 join at the outlet 44. Another side of the second passage 46 bypasses the first radiator 42, and is connected to the first thermostat valve 45 (see (A) in FIG. 2).

The first thermostat valve 45 opens the second passage 46 in a state of closing the first passage 41. When the second passage 46 opens, the first coolant flows in order of the mechanical water pump 43, the first ATF warmer cooler 47, the oil cooler 48, the internal combustion engine 11, the first thermostat valve 45, and the mechanical water pump 43. While the internal combustion engine 11 and the transmission 15 are cold, the first coolant which received heat from the near exhaust port location 111 of the internal combustion engine 11 radiates the heat to the ATF by the first ATF warmer cooler 47, as will be described later, without radiating the heat by the first radiator 42. The first coolant also radiates the heat to the lubricant in the oil cooler 48. The temperatures of the ATF and the lubricant rise promptly. The fuel efficiency and/or the electricity efficiency of the vehicle 1 improve.

Note that while the first passage 41 is open, the first coolant flows in the second passage 46 in order of the mechanical water pump 43, the first ATF warmer cooler 47, the oil cooler 48, the internal combustion engine 11, the outlet 44, the first radiator 42, the first thermostat valve 45, and the mechanical water pump 43.

The cooling device 3 is provided with a second coolant circuit 5. The second coolant circuit 5 performs temperature management of the electric drive system 2. In the second coolant circuit 5, a second coolant which cools the electric drive system 2 circulates.

The second coolant circuit 5 has a main passage 51. The flow direction of the second coolant in the main passage 51 is illustrated by the direction of a solid-line arrow. The main passage 51 is connected to an electric water pump 52, the DCDC converter 24, the inverter 22, and the electric motor 21. The electric water pump 52 is driven in response to power supply from the low-voltage battery 25. When the electric water pump 52 is driven, the second coolant flows through the main passage 51. The second coolant receives heat from the DCDC converter 24, the inverter 22, and the electric motor 21.

The main passage 51 is connected to a second ATF warmer cooler 53. The second ATF warmer cooler 53 is located downstream of the electric drive system 2 in the circuit configuration illustrated in FIG. 2. The second ATF warmer cooler 53 exchanges heat between the second coolant and the ATF, as will be described later. The second ATF warmer cooler 53 is one example of a second heat exchanger. The second ATF warmer cooler 53 may adopt various structures of known heat exchangers.

The main passage 51 is connected to a second radiator 54. The second radiator 54 makes the second coolant radiate heat. When the electric water pump 52 is driven, the second coolant flows in order of the electric water pump 52, the DCDC converter 24, the inverter 22, the electric motor 21, the second ATF warmer cooler 53, the second radiator 54, and electric water pump 52 to circulate through the main passage 51. While the electric water pump 52 is driven, the temperature of the second coolant which circulates through the main passage 51 is maintained at a given temperature, and thereby the electric drive system 2 is cooled. Note that while both the internal combustion engine 11 and the electric drive system 2 operate, the temperature of the second coolant is generally lower than the temperature of the first coolant.

The second coolant circuit 5 also has a subpassage 55. The subpassage 55 branches from the main passage 51, at a location between the electric water pump 52 and the DCDC converter 24. The flow direction of the second coolant in the subpassage 55 is illustrated by the direction of a solid-line arrow.

A part of the second coolant discharged from the electric water pump 52 flows through the subpassage 55. The subpassage 55 is provided with a flow regulating valve 56 (CSV: Coolant Solenoid Valve). The flow regulating valve 56 adjusts a flow rate of the second coolant which flows through the subpassage 55 in a range from zero to the maximum flow rate in response to a control signal from a controller 7 (described later).

The subpassage 55 is connected to the intercooler 13. The second coolant cools intake air of the internal combustion engine 11. The subpassage 55 is also connected to the second radiator 54. The second coolant which received heat in the intercooler 13 radiates the heat into the atmosphere in the second radiator 54.

The cooling device 3 is provided with an ATF circuit 6. The ATF circuit 6 performs temperature management of the transmission 15. The ATF circulates in the ATF circuit 6. The ATF circuit 6 is one example of a fluid circuit. The ATF lubricates inside the transmission 15, and cools the friction engagement elements.

The ATF circuit 6 has an external passage 61. The external passage 61 is located outside the transmission 15. The ATF flows into the external passage 61 from the inside of the transmission 15, and returns into the transmission 15 from the external passage 61. The flow direction of the ATF in the external passage 61 is illustrated by the direction of a broken-line arrow.

The ATF circuit 6 has a fluid pump 62. The fluid pump 62 is connected inside the transmission 15 to a shaft 151 of the transmission 15. The fluid pump 62 is driven by rotation of the shaft 151. Therefore, the fluid pump 62 is driven while the vehicle 1 travels. By driving the fluid pump 62, the ATF is supplied to every place inside the transmission 15 to perform lubrication and cooling. Further, by driving the fluid pump 62, the ATF is supplied to a hydraulic control circuit to perform a transmission control of the transmission 15. Further, by driving the fluid pump 62, the ATF circulates through the external passage 61.

The external passage 61 is connected to the first ATF warmer cooler 47 and the second ATF warmer cooler 53 which are described above. In the ATF circuit 6, the first ATF warmer cooler 47 and the second ATF warmer cooler 53 are in-series. Regarding the flow direction of the ATF, the second ATF warmer cooler 53 is located downstream of the first ATF warmer cooler 47. When the fluid pump 62 is driven, the ATF discharged from the transmission 15 to the external passage 61 exchanges heat with the first coolant by the first ATF warmer cooler 47 and exchanges heat with the second coolant by the second ATF warmer cooler 53, and it then returns to the transmission 15.

The ATF circuit 6 has a first bypass passage 63. The first bypass passage 63 is a passage which bypasses the first ATF warmer cooler 47.

The ATF circuit 6 has a selector valve 64. The selector valve 64 changes the flow direction of the ATF between the first ATF warmer cooler 47 side and the first bypass passage 63 side. The selector valve 64 may be an on-off valve, for example. The selector valve 64 changes between ON and OFF based on an energization signal from the controller 7 (described later). Concretely, as illustrated in an upper figure and a lower figure of FIG. 5, when the selector valve 64 receives the energization signal from the controller 7, it becomes ON so that the ATF passes through the first ATF warmer cooler 47. As illustrated in a middle figure of FIG. 5, when the selector valve 64 does not receive the energization signal from the controller 7, it becomes OFF so that the ATF flows through the first bypass passage 63. The selector valve 64 is one example of a first adjuster. The combination of the selector valve 64 and the first bypass passage 63 can change the passing flow rate through the first ATF warmer cooler 47, while keeping the circulation flow rate of the ATF circuit 6 constant.

Note that although in the illustrated ATF circuit 6 the selector valve 64 is located upstream of the first ATF warmer cooler 47, the selector valve 64 may be located downstream of the first ATF warmer cooler 47. Further, the ATF circuit 6 may have a flow regulating valve, instead of the selector valve 64. The flow regulating valve adjusts a ratio of a flow rate of the ATF which passes through the first ATF warmer cooler 47 and a flow rate of the ATF which flows through the first bypass passage 63 in response to the control signal from the controller 7. The flow regulating valve may adjust the ratio of the flow rate of the ATF which passes through the first ATF warmer cooler 47 and the flow rate of the ATF which flows through the first bypass passage 63, for example, between 0:10 and 10:0.

The ATF circuit 6 has a second bypass passage 65. The second bypass passage 65 is a passage which bypasses the second ATF warmer cooler 53.

Figure 5:
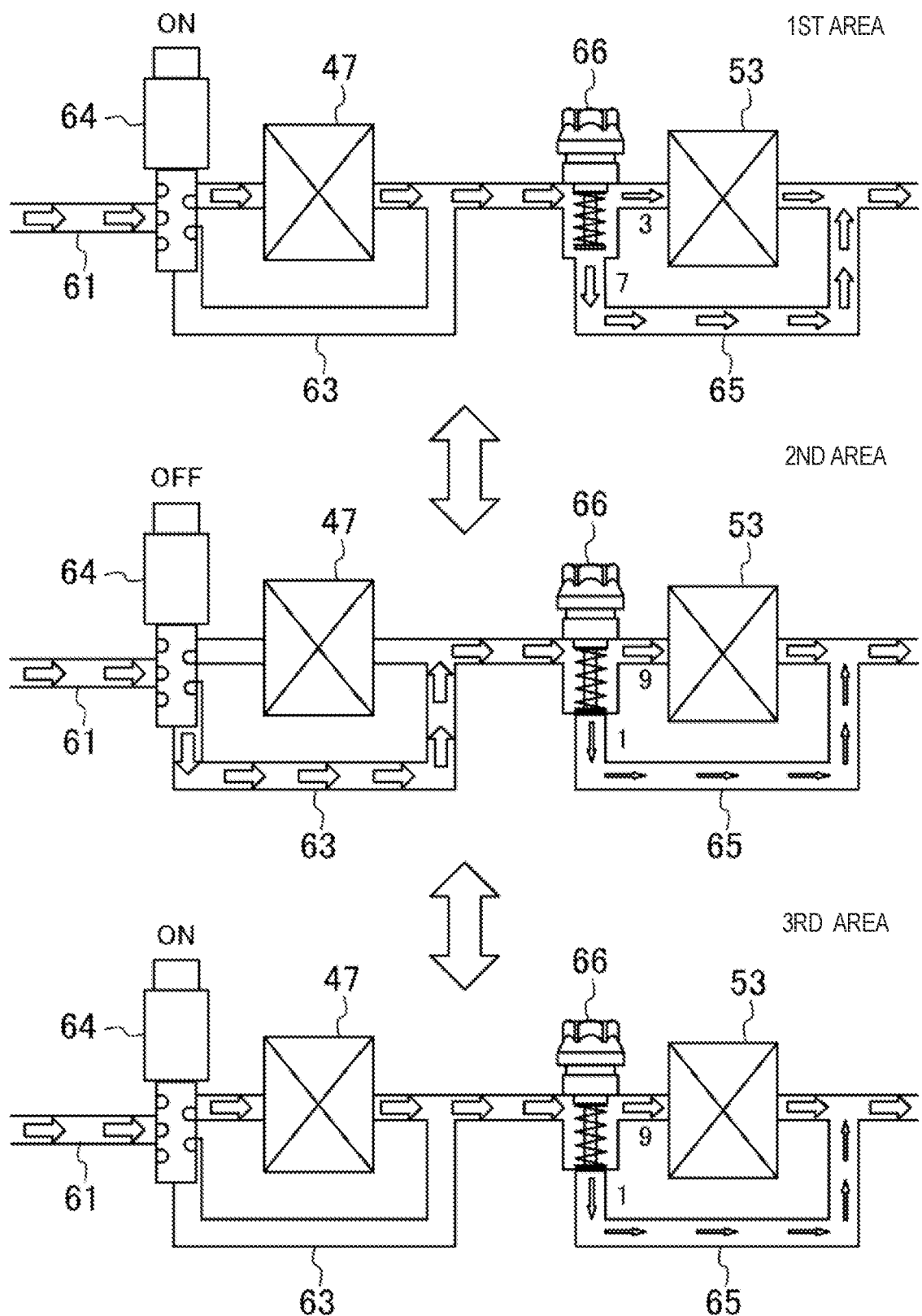
FIG. 5 illustrates a flow rate ratio of the ATF (Automatic Transmission Fluid) in each area of the control map.

The ATF circuit 6 has a second thermostat valve 66. The second thermostat valve 66 changes the flow rate of the ATF which passes through the second ATF warmer cooler 53. The second thermostat valve 66 is a valve which changes its opening according to the temperature of the second coolant. As illustrated in the upper figure of FIG. 5, when the temperature of the second coolant is below a preset temperature, the second thermostat valve 66 makes the flow rate of the ATF which flows through the second bypass passage 65 larger than the flow rate of the ATF which flows through the second ATF warmer cooler 53. Note that "3" and "7" of FIG. 5 illustrate the flow rate ratio. As illustrated in the middle figure or the lower figure of FIG. 5, when the temperature of the second coolant is above the preset temperature, the second thermostat valve 66 makes the flow rate of the ATF which flows through the second bypass passage 65 smaller than the flow rate of the ATF which flows through the second ATF warmer cooler 53. Note that "9" and "1" of FIG. 5 illustrate the flow rate ratio. The preset temperature is 50 to 60° C., for example. The second thermostat valve 66 is one example of a second adjuster. The combination of the second thermostat valve 66 and the second bypass passage 65 can change the passing flow rate through the second ATF warmer cooler 53, while keeping the circulation flow rate of the ATF circuit 6 constant.

Note that although in the illustrated ATF circuit 6 the second thermostat valve 66 is located upstream of the second ATF warmer cooler 53, the second thermostat valve 66 may be located downstream of the second ATF warmer cooler 53. Further, the ATF circuit 6 may have an electrically-controlled flow regulating valve, instead of the second thermostat valve 66. The electrically-controlled flow regulating valve adjusts a ratio of the flow rate of the ATF which passes through the second ATF warmer cooler 53 and the flow rate of the ATF which flows through the second bypass passage 65 in response to a control signal from the controller 7 (described later). The ATF circuit 6 may have an electrically-controlled on-off valve, instead of the second thermostat valve 66. The on-off valve changes between a state where the ATF passes through the second ATF warmer cooler 53 but it does not pass through the second bypass passage 65 and a state where the ATF does not pass through the second ATF warmer cooler 53 but it passes through the second bypass passage 65, in response to an energization signal from the controller 7.

Figure 3:
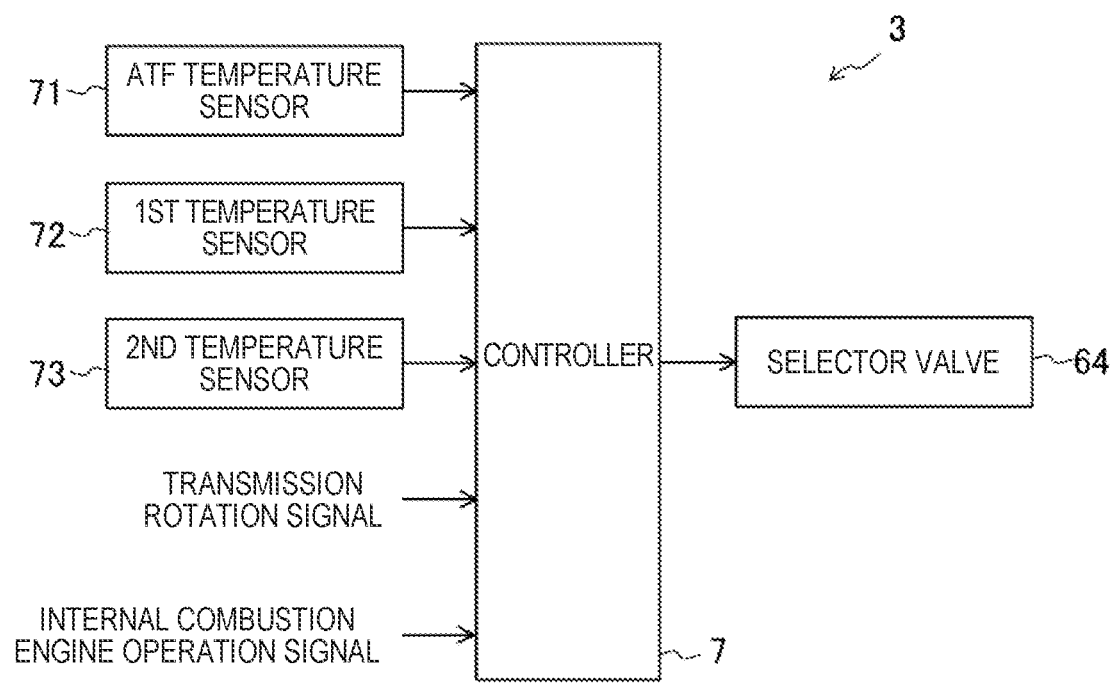
FIG. 3 is a control block diagram of the cooling device.

FIG. 3 illustrates a configuration related to a control of the cooling device 3. The cooling device 3 has the controller 7. The controller 7 is comprised of hardware, such as a processor, memory, and an interface, and software, such as a database and a control program. The controller 7 is connected to the selector valve 64 described above.

The cooling device 3 has an ATF temperature sensor 71. The ATF temperature sensor 71 is installed in the external passage 61 of the ATF circuit 6 (also see FIG. 2). Note that the installed location of the ATF temperature sensor 71 is not limited to a specific location. The ATF temperature sensor 71 outputs a measurement signal corresponding to the temperature of the ATF to the controller 7.

The cooling device 3 has a first temperature sensor 72. The first temperature sensor 72 is attached to the internal combustion engine 11, for example (also see FIG. 2). Note that the first temperature sensor 72 may be installed at a suitable location in the first passage 41. The first temperature sensor 72 outputs a measurement signal corresponding to the temperature of the first coolant to the controller 7.

The cooling device 3 has a second temperature sensor 73. The second temperature sensor 73 is installed in the main passage 51 of the second coolant circuit 5 (see also FIG. 2). Note that the second temperature sensor 73 may be installed at a suitable location in the main passage 51. The second temperature sensor 73 outputs a measurement signal corresponding to the temperature of the second coolant to the controller 7.

The controller 7 receives the measurement signals from the ATF temperature sensor 71, the first temperature sensor 72, and the second temperature sensor 73.

The controller 7 also receives a rotation signal of the transmission 15. Based on the rotation signal of the transmission 15, the controller 7 determines whether the fluid pump 62 connected to the shaft 151 of the transmission 15 is in operation. Note that the controller 7 may 7 may use various signals as the rotation signal of the transmission 15.

The controller 7 further receives an operation signal of the internal combustion engine 11. Based on the operation signal of the internal combustion engine 11, the controller 7 determines whether the internal combustion engine 11 is in operation. Note that the controller 7 may use various signals as the operation signal of the internal combustion engine 11.

The controller 7 changes between output of the energization signal to the selector valve 64, and stop of the energization signal based on the temperature of the ATF, the temperature of the first coolant, the temperature of the second coolant, the rotation signal of the transmission 15, and the operation signal of the internal combustion engine 11. The detailed control of the selector valve 64 by the controller 7 will be described later.

(Control of Cooling Device)

Figure 4:
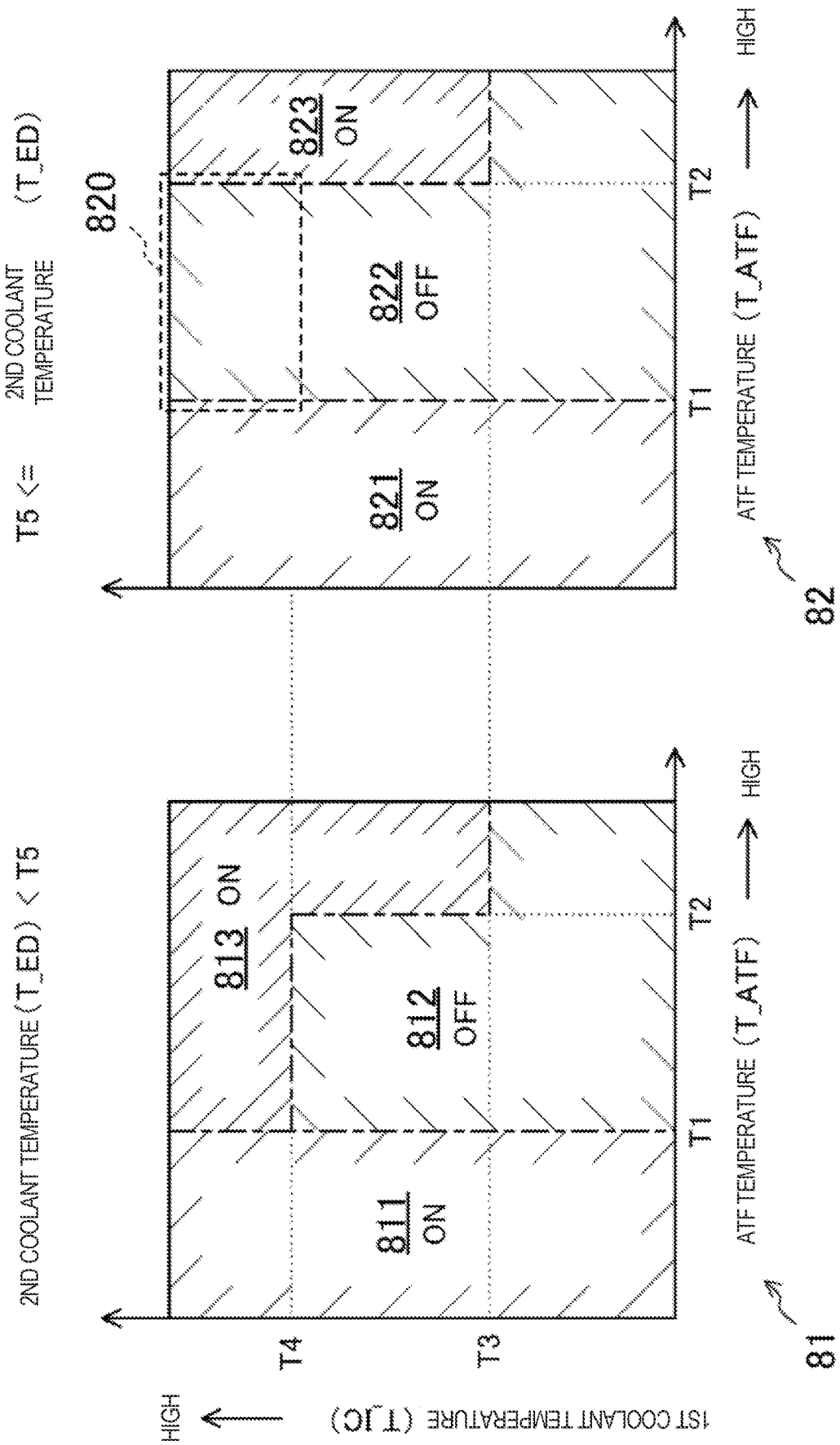
FIG. 4 is a control map of the cooling device.

FIG. 4 illustrates control maps 81 and 82 of the cooling device 3. As described above, the controller 7 changes between the output of the energization signal to the selector valve 64 and the stop of the energization signal based on the temperature of the ATF, the temperature of the first coolant, the temperature of the second coolant, and the control maps 81 and 82.

The control map includes the first control map 81 and the second control map 82. The first control map 81 is a map for a case where a temperature (T_ED) of the second coolant is below a fifth temperature (T5), and the second control map 82 is a map for a case where the temperature (T_ED) of the second coolant is above the fifth temperature (T5). The fifth temperature (T5) may be determined according to the allowable temperature of the electric drive system 2. The fifth temperature (T5) may be set between a third temperature (T3) and a fourth temperature (T4) which will be described later. The fifth temperature (T5) may be 60 to 70° C., for example.

The two control maps 81 and 82 are both defined by a temperature (T_ATF) of the ATF and a temperature (T_IC) of the first coolant. Note that in the control maps 81 and 82, an upper limit of the temperature (T_ATF) of the ATF and an upper limit of the temperature (T_IC) of the first coolant are determined.

(First Control Map)

The first control map 81 is divided into three areas, a first area 811, a second area 812, and a third area 813 (see one-dot chain lines of FIG. 4). The first area 811, the second area 812, and the third area 813 are divided from the first control map 81 in terms of the temperature of the ATF in general.

The first area 811 is an area where the temperature (T_ATF) of the ATF is below a first temperature (T1).

The second area 812 includes an area where the temperature (T_ATF) of the ATF is above the first temperature (T1) and below a second temperature (T2 (>T1)), and the temperature (T_IC) of the first coolant is below the fourth temperature (T4), and an area where the temperature (T_ATF) of the ATF is above the second temperature (T2) and the temperature (T_IC) of the first coolant is below the third temperature (T3 (<T4)).

The third area 813 includes an area where the temperature (T_ATF) of the ATF is above the first temperature (T1) and below the second temperature (T2), and the temperature (T_IC) of the first coolant is above the fourth temperature (T4), and an area where the temperature (T_ATF) of the ATF is above the second temperature (T2), and the temperature (T_IC) of the first coolant is above the third temperature (T3).

Note that the first temperature (T1) and the third temperature (T3) may be almost the same (T1≈T3). The first temperature (T1) may be 50 to 60° C., and the third temperature (T3) may also be 50 to 60° C. The first temperature (T1) corresponds to the preset temperature of the second thermostat valve 66 described above. The second temperature (T2) and the fourth temperature (T4) may be almost the same (T2≈T4). The second temperature (T2) may be 95 to 105° C., and the fourth temperature (T4) may also be 95 to 105° C.

The first area 811 corresponds to cold operation (cold start) of the transmission 15. The controller 7 outputs the energization signal to the selector valve 64 (i.e., ON) in the first area 811. The upper figure of FIG. 5 illustrates a flow rate ratio of the ATF in the ATF circuit 6 in the first area 811. The ATF passes through the first ATF warmer cooler 47. In the first ATF warmer cooler 47, the temperature of the ATF rises due to the heat of the internal combustion engine 11.

Here, while the internal combustion engine 11 is cold, the first thermostat valve 45 closes the first passage 41 and opens the second passage 46, as described above. Since the first coolant circulates while bypassing the first radiator 42, the temperature of the first coolant rises promptly due to the heat of the internal combustion engine 11. The temperature of the ATF rises promptly in connection with the temperature rise of the first coolant. Since the temperature rise of the ATF reduces the resistance of the transmission 15, the fuel efficiency and/or the electricity efficiency of the vehicle improves.

Further, when the internal combustion engine 11 is warm after the temperature of the first coolant is increased, the temperature of the first coolant is maintained at a suitable temperature by the first thermostat valve 45 opening the first passage 41, as described above. The ATF increases in the temperature while receiving the heat from the first coolant.

Further, in the first area 811 where the temperature of the ATF is low, the flow rate of the ATF which flows through the second ATF warmer cooler 53 is made relatively small by the second thermostat valve 66. Therefore, the heat exchange between the ATF and the second coolant in the second ATF warmer cooler 53 is suppressed. That is, the ATF which received heat in the first ATF warmer cooler 47 is suppressed from radiating the heat to the second coolant in the second ATF warmer cooler 53. This heat radiation control is also advantageous to the prompt temperature rise of the ATF.

The second area 812 corresponds to hot operation (hot start) of the transmission 15. The controller 7 stops the energization signal to the selector valve 64 (i.e., OFF) in the second area 812. The middle figure of FIG. 5 illustrates a flow rate ratio of the ATF in the ATF circuit 6 in the second area 812. The ATF bypasses the first ATF warmer cooler 47. Therefore, the heat exchange of the ATF and the first coolant in the first ATF warmer cooler 47 is not performed.

The second area 812 mainly corresponds to the normal travel of the vehicle. This "normal travel" means travel not being the cold start as described above, and not being off-road travel or towing (described later). In the second area 812, the ATF which is above the first temperature (T1) and below the second temperature (T2) maintains the suitable temperature.

The small flow rate of the fluid which passes through the first ATF warmer cooler 47 during the normal travel of the vehicle suppresses the heat transfer from the first coolant to the ATF. That is, an excessive temperature drop of the first coolant is suppressed. Since this suppresses the increase in the friction loss of the internal combustion engine 11, it suppresses deterioration of the fuel efficiency of the internal combustion engine 11. Further, an excessive temperature rise of the ATF is suppressed. This suppresses the fall of the lubricating performance of the transmission 15 resulting from an excessive viscosity fall of the ATF.

Note that in the second area 812, the flow rate of the ATF which flows through the second ATF warmer cooler 53 is made relatively large by the second thermostat valve 66. In the second ATF warmer cooler 53, heat exchange between the ATF and the second coolant is performed. Therefore, the second coolant generator also maintains the suitable temperature.

Further, a part of the second area 812 where the temperature (T_ATF) of the ATF is above the second temperature (T2) corresponds to a case where the friction engagement elements 16 of the transmission 15 tend to generate heat due to the off-road travel or towing. However, since in the part of the second area 812 where the temperature (T_ATF) of the ATF is above the second temperature (T2) the temperature of the first coolant is lower than the temperature of the ATF, heat exchange will be performed excessively if the heat exchange of the ATF and the first coolant is performed. In this partial area, the temperature of the ATF can be appropriately maintained by not performing heat exchange by the first ATF warmer cooler 47, but performing heat exchange between the ATF and the second coolant in the second ATF warmer cooler 53.

Further, since in the second area 812 the controller 7 stops the energization signal to the selector valve 64, it is advantageous to the improvement in the fuel and/or electricity efficiency of the vehicle 1. In the general travel of the vehicle 1, since the frequency of the second area 812 is higher than the frequencies of the first area 811 and the third area 813, it is effective in the improvement in the fuel and/or electricity efficiency of the vehicle 1 to stop the energization signal to the selector valve 64 in the second area 812.

The third area 813 is an area where the temperature of the ATF and/or the first coolant is high. The controller 7 outputs the energization signal to the selector valve 64 (i.e., ON) in the third area 813. The lower figure of FIG. 5 illustrates a flow rate ratio of the ATF in the ATF circuit 6 in the third area 813. The ATF passes through the first ATF warmer cooler 47. In the first ATF warmer cooler 47, heat exchange is performed between the ATF and the first coolant. Further, the flow rate of the ATF which passes through the second ATF warmer cooler 53 is large. In the second ATF warmer cooler 53, heat exchange is performed between the ATF and the second coolant.

When the temperature of the ATF is high in the third area 813, the ATF can radiate the heat from both the first ATF warmer cooler 47 and the second ATF warmer cooler 53. Therefore, the excessive rise of the temperature of the ATF is suppressed.

When the temperature of the first coolant is high in the third area 813, the heat of the first coolant moves to the ATF in the first ATF warmer cooler 47. The ATF which received heat in the first ATF warmer cooler 47 radiates the heat to the second coolant in the second ATF warmer cooler 53. Here, since the temperature of the second coolant is low in general in the first control map 81, the heat transfer from the ATF to the second coolant in the second ATF warmer cooler 53 is stimulated. This is advantageous to the stimulation of the temperature fall of the first coolant.

The third area 813 corresponds to the off-road travel or towing by the vehicle 1. In the third area 813, it can suppress that the excessive temperature rises of the ATF and/or the first coolant.

(Second Control Map)

The temperature of the electric drive system 2 tends to be influenced by ambient temperature. If the ambient temperature is high, the temperature of the electric drive system 2 becomes high, and in connection with this, the temperature of the second coolant becomes high. If the temperature (T_ED) of the second coolant becomes above the fifth temperature (T5), it is demanded to keep the temperature of the electric drive system 2 from exceeding the allowable temperature by suppressing the rise of the temperature (T_ED) of the second coolant.

As illustrated in FIG. 4, the second control map 82 is also divided into the three areas, a first area 821, a second area 822, and a third area 823 in terms of the temperature of the ATF in general. The first area 821 of the second control map 82 is the same as the first area 811 of the first control map 81.

The second area 822 of the second control map 82 includes an area where the temperature (T_ATF) of the ATF is above the first temperature (T1) and below the second temperature (T2), and an area where the temperature (T_ATF) of the ATF is above the second temperature (T2) and the temperature (T_IC) of the first coolant is below the third temperature (T3).

The third area 823 of the second control map 82 is an area where the temperature (T_ATF) of the ATF is above the second temperature (T2) and the temperature (T_IC) of the first coolant is above the third temperature (T3).

When the first control map 81 is compared with the second control map 82, a specific area 820 where the temperature (T_ATF) of the ATF is above the first temperature (T1) and below the second temperature (T2), and the temperature (T_IC) of the first coolant is above the fourth temperature (T4) (i.e., an area surrounded by a broken line in the second control map 82) is included in the second area 822 in the second control map 82, while in the first control map 81 such an area is included in the third area 813.

The controller 7 stops the energization signal to the selector valve 64 (i.e., OFF) in the specific area 820. The ATF bypasses the first ATF warmer cooler 47. The heat exchange by the first ATF warmer cooler 47 is not performed. Here, if the heat exchange by the first ATF warmer cooler 47 is performed in this specific area 820, the heat will move from the first coolant to the ATF, and then, the heat will move from the ATF to the second coolant in the second ATF warmer cooler 53, as described above. When the temperature of the second coolant is high, this temperature may become excessively high. Therefore, in the second control map 82, the specific area 820 is included in the second area 822. Since heat exchange by the first ATF warmer cooler 47 is not performed, the temperature rise of the second coolant is suppressed. Note that the flow rate ratio of the ATF in the ATF circuit 6 for each of the first area 821, the second area 822, and the third area 823 in the second control map 82 is as illustrated in FIG. 5.

(Control Flow of Cooling Device)

Figure 6:
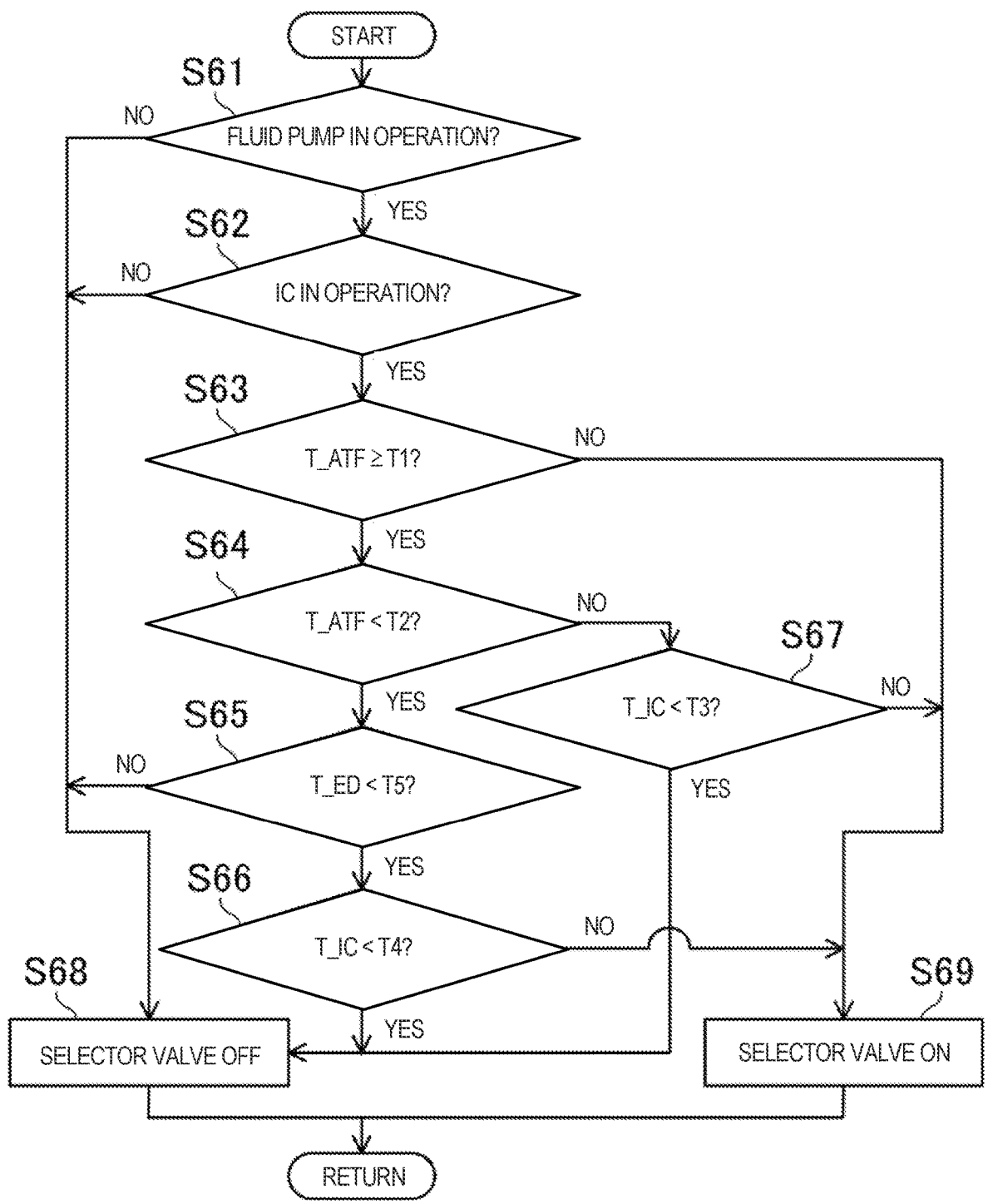
FIG. 6 is a flowchart according to a control of a selector valve.

FIG. 6 illustrates a control procedure related to energization of the selector valve 64 which is performed by the controller 7 of the cooling device 3 based on the control maps 81 and 82 of FIG. 4. Note that the flowchart of FIG. 6 is merely illustration. In this flowchart, the order of the steps may be changed, one or more new steps may be added, or some of the steps may be omitted to the extent possible.

At Step S61 after START, the controller 7 first determines whether the fluid pump 62 is in operation based on a transmission rotation signal. If the fluid pump 62 is stopped (i.e., No at Step S61), the controller 7 stops the energization signal to the selector valve 64 at Step S68. This is because the ATF does not circulate through the ATF circuit 6. It is advantageous to improvement in the fuel efficiency and/or the electricity efficiency to stop the energization signal to the selector valve 64.

If the fluid pump 62 is in operation (i.e., Yes at Step S61), the controller 7 determines whether the internal combustion engine 11 is in operation based on an internal combustion engine operation signal at Step S62. If the internal combustion engine 11 is stopped (i.e., No at Step S62), the controller 7 stops the energization signal to the selector valve 64 at Step S68. This is because the mechanical water pump 43 is stopped so that the first coolant does not circulate through the first coolant circuit 4 and heat exchange is not performed by the first ATF warmer cooler 47. Note that the stopped state of the internal combustion engine 11 corresponds to the EV mode.

If the internal combustion engine 11 is in operation (i.e., Yes at Step S62, and corresponding to the HEV mode), the controller 7 determines whether the temperature (T_ATF) of the ATF is above the first temperature (T1) based on the measurement signal of the ATF temperature sensor 71 at Step S63. If the temperature (T_ATF) of the ATF is below the first temperature (T1) (i.e., No at Step S63), the control map corresponds to the first area 811 of the first control map 81, or the first area 821 of the second control map 82. The controller 7 outputs the energization signal to the selector valve 64 at Step S69.

If the temperature (T_ATF) of the ATF is above the first temperature (T1) (i.e., Yes at Step S63), the controller 7 determines whether the temperature (T_ATF) of the ATF is below the second temperature (T2) based on the measurement signal of the ATF temperature sensor 71 at Step S64.

If the temperature (T_ATF) of the ATF is below the second temperature (T2) (i.e., Yes at Step S64), the controller 7 determines whether the temperature (T_ED) of the second coolant is below the fifth temperature (T5) based on the measurement signal of the second temperature sensor 73 at Step S65. If the temperature (T_ED) of the second coolant is above the fifth temperature (T5) (i.e., No at Step S65), the control map corresponds to the second area 822 of the second control map 82. The controller 7 stops the energization signal to the selector valve 64 at Step S68.

If the temperature (T_ED) of the second coolant is below the fifth temperature (T5) (i.e., Yes at Step S65), the controller 7 determines whether the temperature (T_IC) of the first coolant is below the fourth temperature (T4) based on the measurement signal of the first temperature sensor 72 at Step S66.

If the temperature (T_IC) of the first coolant is below the fourth temperature (T4) (i.e., Yes at Step S66), the control map corresponds to the second area 812 of the first control map 81. The controller 7 stops the energization signal to the selector valve 64 at Step S68.

If the temperature (T_IC) of the first coolant is above the fourth temperature (T4) (i.e., No at Step S66), the control map corresponds to the third area 813 of the first control map 81. The controller 7 outputs the energization signal to the selector valve 64 at Step S69.

Returning to Step S64, if the temperature (T_ATF) of the ATF is above the second temperature (T2) (i.e., No at Step S64), the controller 7 determines whether the temperature (T_IC) of the first coolant is below the third temperature (T3) based on the measurement signal of the first temperature sensor 72 at Step S67.

If the temperature (T_IC) of the first coolant is below the third temperature (T3) (i.e., Yes at Step S67), the control map corresponds to the second area 812 of the first control map 81, or the second area 822 of the second control map 82. The controller 7 stops the energization signal to the selector valve 64 at Step S68.

If the temperature (T_IC) of the first coolant is above the third temperature (T3) (i.e., No at Step S67), the control map corresponds to the third area 813 of the first control map 81, or the third area 823 of the second control map 82. The controller 7 outputs the energization signal to the selector valve 64 at Step S69.

According to this cooling device 3, since the ATF circuit 6 has the selector valve 64 which changes the flow rate of the ATF which passes through the first ATF warmer cooler 47, and the second thermostat valve 66 which changes the flow rate of the ATF which passes through the second ATF warmer cooler 53, the suitable maintenance of the temperature of the ATF can be realized in the cooling device 3 provided with the two heat exchangers.

Especially, the torque-converterless transmission 15 is mounted on the vehicle 1, and the friction engagement elements 16 of the transmission 15 tend to generate heat when traveling off-road or towing. However, since the cooling device 3 is capable of efficiently cooling the ATF using the first ATF warmer cooler 47 and the second ATF warmer cooler 53, it is advantageous to the cooling of the friction engagement elements 16.

On the other hand, heat exchange by the first ATF warmer cooler 47 is not performed during the normal travel in which the heat generation of the friction engagement elements 16 is suppressed. Since it can suppress that the temperature of the first coolant decreases excessively, it can suppress the increase in the friction loss of the internal combustion engine 11. The cooling device 3 can suppress the deterioration in the fuel efficiency of the internal combustion engine 11.

(Modification of Cooling Device)

Figure 7:
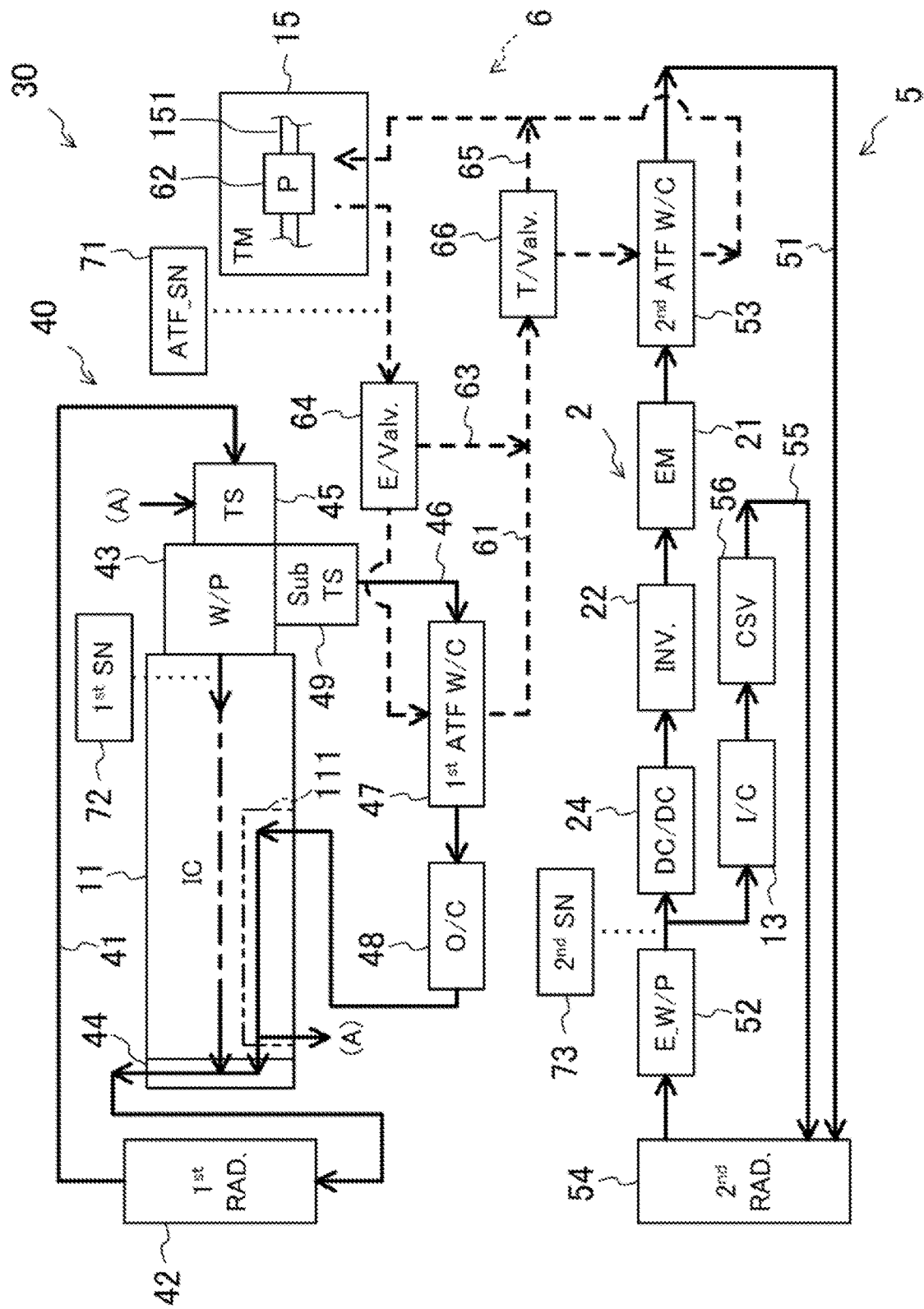
FIG. 7 is a circuit diagram of another cooling device.

FIG. 7 is a circuit diagram of a cooling device 30 according to a modification. The cooling device 30 is constituted by adding a sub-thermostat valve 49 to the first coolant circuit 40 of the cooling device 3 of FIG. 2. The sub-thermostat valve 49 is connected to the second passage 46. The sub-thermostat valve 49 is a valve which opens and closes according to the temperature of the first coolant. The sub-thermostat valve 49 may adopt known structures which use, for example, wax. If the temperature of the first coolant becomes a second valve-opening temperature, the sub-thermostat valve 49 opens the second passage 46. The second valve-opening temperature may be, for example, the third temperature (T3) described above. The second valve-opening temperature is lower than the valve-opening temperature of the first thermostat valve 45. An electrically-controlled on-off valve or an electrically-controlled flow regulating valve may be connected to the second passage 46, instead of the sub-thermostat valve 49.

When the second passage 46 is opened by the sub-thermostat valve 49, the first coolant flows in order of the mechanical water pump 43, the sub-thermostat valve 49, the first ATF warmer cooler 47, the oil cooler 48, the internal combustion engine 11, the first thermostat valve 45, and the mechanical water pump 43, and circulates through the second passage 46. When the sub-thermostat valve 49 closes the second passage 46, the first coolant does not pass through the first ATF warmer cooler 47.

Figure 8:
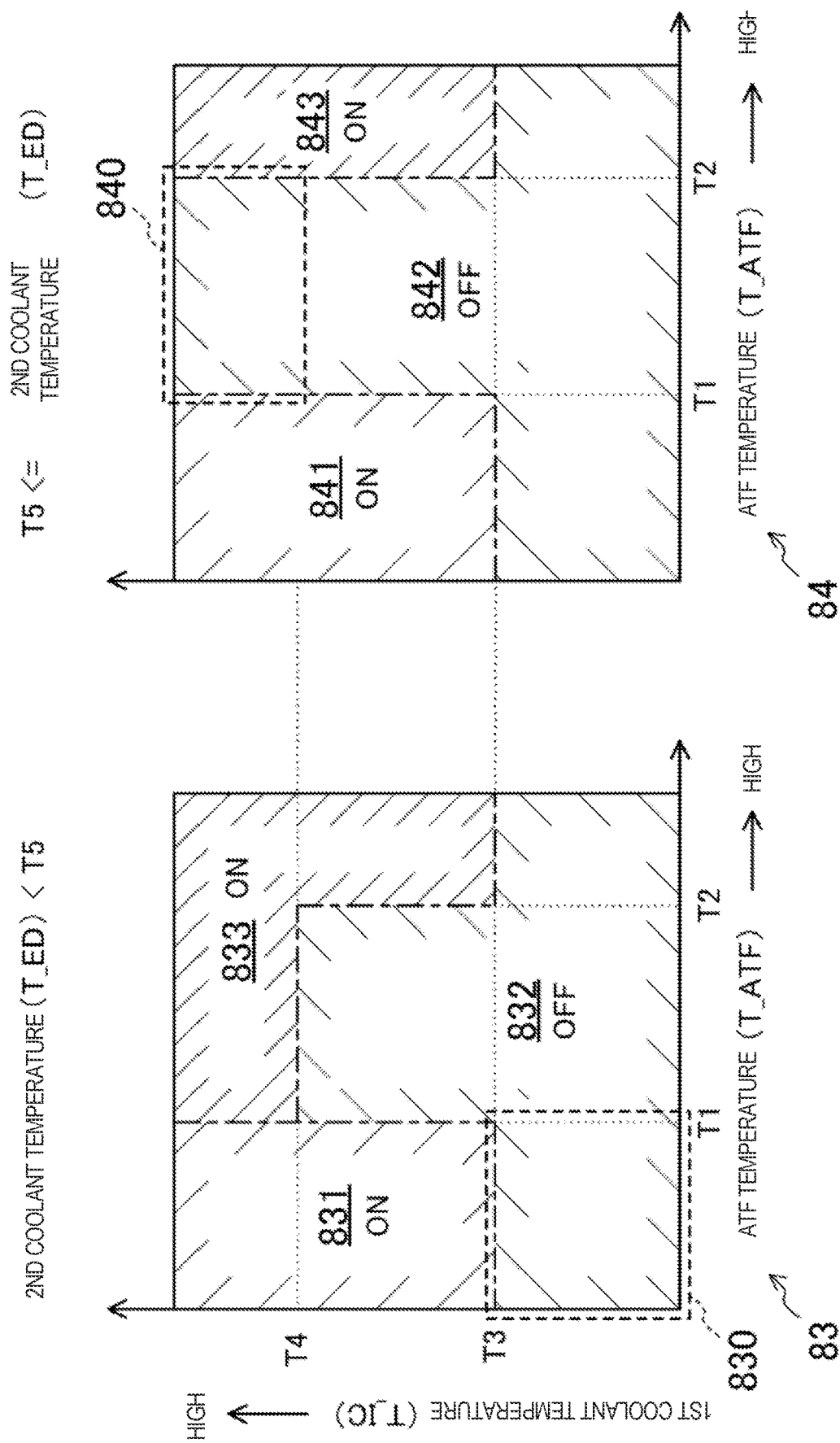
FIG. 8 is another control map of the cooling device.

FIG. 8 illustrates control maps 83 and 84 of the cooling device 30. The first control map 83 is divided into a first area 831, a second area 832, and a third area 833. When the first control map 83 is compared with the first control map 81 of FIG. 4, the third areas 813 and 833 are common.

A second specific area 830 where the temperature (T_ATF) of the ATF is below the first temperature (T1) and the temperature (T_IC) of the first coolant is below the third temperature (T3) (i.e., an area surrounded by a broken line in the first control map 83) is included in the second area 832 in the first control map 83 of FIG. 8, while in the first control map 81 of FIG. 4 such an area is included in the first area 811.

If the temperature (T_IC) of the first coolant is below the third temperature (T3), the sub-thermostat valve 49 closes the second passage 46. Therefore, the first coolant does not pass through the first ATF warmer cooler 47.

The controller 7 stops the energization signal to the selector valve 64 (i.e., OFF) in the second specific area 830. The ATF bypasses the first ATF warmer cooler 47. The heat exchange by the first ATF warmer cooler 47 is not performed. Since the energization signal to the selector valve 64 is stopped when not needed, it is advantageous to improvement in the fuel efficiency and/or the electricity efficiency of the vehicle 1. In the first control map 83 of FIG. 8, if the temperature (T_IC) of the first coolant is below the third temperature (T3), the energization signal to the selector valve 64 is stopped regardless of the temperature of the ATF.

The second control map 84 of FIG. 8 is divided into a first area 841, a second area 842, and a third area 843. When the first control map 83 is compared with the second control map 84, the first areas 831 and 841 are the same. Also in the second control map 84, if the temperature (T_IC) of the first coolant is below the third temperature (T3), the energization signal to the selector valve 64 is stopped regardless of the temperature of the ATF.

When the first control map 83 is compared with the second control map 84, a specific area 840 where the temperature (T_ATF) of the ATF is above the first temperature (T1) and below the second temperature (T2), and the temperature (T_IC) of the first coolant is above the fourth temperature (T4) is included in the second area 842 in the second control map 84, while in the first control map 83 such an area is included in the third area 833. This is the same as the relation between the first control map 81 and the second control map 82 of FIG. 4.

Note that the flow rate ratio of the ATF in the ATF circuit 6 for each of the first area 831, the second area 832, and the third area 833 in the first control map 83 is as illustrated in FIG. 5. The flow rate ratio of the ATF in the ATF circuit 6 for each of the first area 841, the second area 842, and the third area 843 in the second control map 84 is also as illustrated in FIG. 5.

Figure 9:
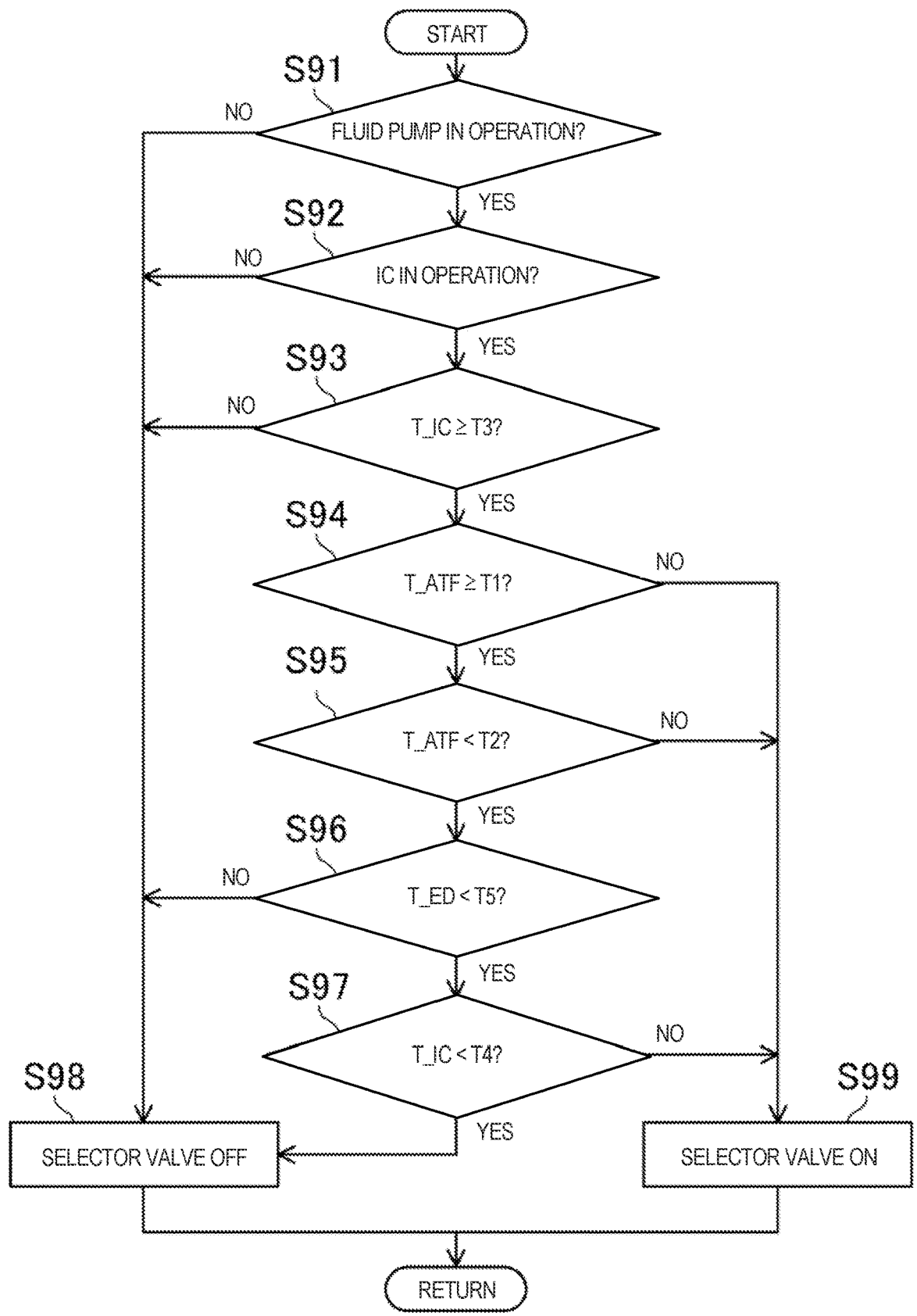
FIG. 9 is another flowchart according to the control of the selector valve.

FIG. 9 illustrates a control procedure related to the energization of the selector valve 64 which the controller 7 of the cooling device 30 performs based on the control maps 83 and 84 of FIG. 8. Note that the flowchart of FIG. 9 is merely illustration. In this flowchart, the order of the steps may be changed, one or more new steps may be added, or some of the steps may be omitted to the extent possible.

At Step S91 after START, the controller 7 first determines whether the fluid pump 62 is in operation based on the transmission rotation signal. If the fluid pump 62 is stopped (i.e., No at Step S91), the controller 7 stops the energization signal to the selector valve 64 at Step S98. This is because the ATF does not circulate through the ATF circuit 6. It is advantageous to improvement in the fuel efficiency and/or the electricity efficiency to stop the energization signal to the selector valve 64.

If the fluid pump 62 is in operation (i.e., Yes at Step S91), the controller 7 determines whether the internal combustion engine 11 is in operation based on the internal combustion engine operation signal at Step S92. If the internal combustion engine 11 is stopped (i.e., No at Step S92), the controller 7 stops the energization signal to the selector valve 64 at Step S98. This is because the mechanical water pump 43 is stopped, the first coolant does not circulate through the first coolant circuit 40, and heat exchange is not performed by the first ATF warmer cooler 47. Note that the stopped state of the internal combustion engine 11 corresponds to the EV mode.

If the internal combustion engine 11 is in operation (i.e., Yes at Step S92, and corresponding to the HEV mode), the controller 7 determines whether the temperature (T_IC) of the first coolant is above the third temperature (T3) based on the measurement signal of the first temperature sensor 72 at Step S93. If the temperature (T_IC) of the first coolant is below the third temperature (T3) (i.e., No at Step S93), the sub-thermostat valve 49 closes the second passage 46 so that the first coolant is not supplied to the first ATF warmer cooler 47, as described above. The control map corresponds to the second area 832 of the first control map 83, or the second area 842 of the second control map 84. The controller 7 stops the energization signal to the selector valve 64 at Step S98, regardless of the temperature of the ATF.

If the temperature (T_IC) of the first coolant is above the third temperature (T3) (i.e., Yes at Step S93), the controller 7 determines whether the temperature (T_ATF) of the ATF is above the first temperature (T1) based on the measurement signal of the ATF temperature sensor 71 at Step S94. If the temperature (T_ATF) of the ATF is below the first temperature (T1) (i.e., No at Step S94), the control map corresponds to the first area 831 of the first control map 83, or the first area 841 of the second control map 84. The controller 7 outputs the energization signal to the selector valve 64 at Step S99.

If the temperature (T_ATF) of the ATF is above the first temperature (T1) (i.e., Yes at Step S94), the controller 7 determines whether the temperature (T_ATF) of the ATF is below the second temperature (T2) based on the measurement signal of the ATF temperature sensor 71 at Step S95.

If the temperature (T_ATF) of the ATF is above the second temperature (T2) (i.e., No at Step S95), the control map corresponds to the third area 833 of the first control map 83, or the third area 843 of the second control map 84. The controller 7 outputs the energization signal to the selector valve 64 at Step S99.

If the temperature (T_ATF) of the ATF is below the second temperature (T2) (i.e., Yes at Step S95), the controller 7 determines whether the temperature (T_ED) of the second coolant is below the fifth temperature (T5) based on the measurement signal of the second temperature sensor 73 at Step S96. If the temperature (T_ED) of the second coolant is above the fifth temperature (T5) (i.e., No at Step S96), the control map corresponds to the second area 842 of the second control map 84. The controller 7 stops the energization signal to the selector valve 64 at Step S98.

If the temperature (T_ED) of the second coolant is below the fifth temperature (T5) (i.e., Yes at Step S96), the controller 7 determines whether the temperature (T_IC) of the first coolant is below the fourth temperature (T4) based on the measurement signal of the first temperature sensor 72 at Step S97.

If the temperature (T_IC) of the first coolant is below the fourth temperature (T4) (i.e., Yes at Step S97), the control map corresponds to the second area 832 of the first control map 83. The controller 7 stops the energization signal to the selector valve 64 at Step S98.

If the temperature (T_IC) of the first coolant is above the fourth temperature (T4) (i.e., No at Step S97), the control map corresponds to the third area 833 of the first control map 83. The controller 7 outputs the energization signal to the selector valve 64 at Step S99.

According to the cooling device 30 provided with the two heat exchangers, suitable maintenance of the temperature of the ATF can be realized similarly to the cooling device 3.

Further, when traveling off-road or towing, the cooling device 3 can efficiently cool the ATF using the first ATF warmer cooler 47 and the second ATF warmer cooler 53, and during normal travel, it does not perform heat exchange by the first ATF warmer cooler 47. Therefore, the cooling device 3 can suppress that the temperature of the first coolant decreases excessively, and in connection with this, it can suppress the increase in the friction loss of the internal combustion engine 11.

Further, since in the cooling device 30, the second areas 832 and 842 where the energization signal to the selector valve 64 is stopped are greater than in the cooling device 3, it is advantageous to improvement in the fuel efficiency and/or the electricity efficiency of the vehicle 1.

Note that the art disclosed herein is not limited to being applied to the vehicle 1 described above. The propelling system of the vehicle 1 may adopt various structures.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
11 Internal Combustion Engine
12 Driving Wheel
15 Transmission
151 Shaft
2 Electric Drive System
4 First Coolant Circuit
47 First ATF Warmer Cooler (First Heat Exchanger)
5 Second Coolant Circuit
53 Second ATF Warmer Cooler (Second Heat Exchanger)
6 ATF Circuit (Fluid Circuit)
62 Fluid Pump
63 First Bypass Passage
64 Selector Valve (First Adjuster)
65 Second Bypass Passage
66 Second Thermostat Valve (Second Adjuster)
7 Controller

What is claimed is:
1. A cooling device of a vehicle, comprising:
a transmission connected to an internal combustion engine and an electric drive system, and configured to change a gear of an output of at least one of the internal combustion engine and the electric drive system and transfer the output to a driving wheel of the vehicle;
a first coolant circuit through which a first coolant configured to cool the internal combustion engine circulates;
a second coolant circuit independent from the first coolant circuit, through which a second coolant configured to cool the electric drive system circulates; and a fluid circuit through which fluid configured to lubricate and cool friction engagement elements in the transmission circulates, the fluid circuit including:
- a first heat exchanger configured to exchange heat between the fluid and the first coolant;
- a second heat exchanger that is arranged in series with the first heat exchanger, and configured to exchange heat between the fluid and the second coolant;
- a first adjuster valve configured to change a flow rate of the fluid passing through the first heat exchanger; and
- a second adjuster valve configured to change a flow rate of the fluid passing through the second heat exchanger, wherein the first adjuster valve changes the flow rate of the fluid passing through the first heat exchanger, independently from the flow rate of the fluid passing through the second heat exchanger.

2. The cooling device of the vehicle of claim 1, wherein the fluid circuit further includes a first bypass passage bypassing the first heat exchanger, and wherein the first adjuster valve is connected to a controller, and changes a ratio of the flow rate of the fluid passing through the first heat exchanger and a flow rate of the fluid passing through the first bypass passage based on a signal from the controller.

3. The cooling device of the vehicle of claim 2, wherein when temperature of the fluid is below a first temperature, the controller outputs an energization signal to the first adjuster valve to make the flow rate of the fluid passing through the first heat exchanger larger, and wherein when the temperature of the fluid is above the first temperature, the controller stops the energization signal to the first adjuster valve to make the flow rate of the fluid passing through the first heat exchanger smaller than the flow rate when the temperature is below the first temperature.

4. The cooling device of the vehicle of claim 3, wherein when the temperature of the fluid is above a second temperature which is above the first temperature, the controller outputs the energization signal to the first adjuster valve to make the flow rate of the fluid passing through the first heat exchanger larger than the flow rate when the temperature is above the first temperature and below the second temperature.

5. The cooling device of the vehicle of claim 4, wherein when the temperature of the fluid is above the second temperature and a temperature of the first coolant is above a third temperature, the third temperature being below the second temperature and approximately equal to the first temperature, the controller outputs the energization signal to the first adjuster valve to make the flow rate of the fluid passing through the first heat exchanger larger, and wherein when the temperature of the fluid is above the second temperature and the temperature of the first coolant is below the third temperature, the controller stops the energization signal to the first adjuster valve to make the flow rate of the fluid passing through the first heat exchanger smaller than the flow rate when the temperature is above the third temperature.

6. The cooling device of the vehicle of claim 4, wherein when the temperature of the fluid is above the first temperature and below the second temperature, and the temperature of the first coolant is above a fourth temperature, the fourth temperature being above the third temperature and approximately equal to the second temperature, and:

when the temperature of the second coolant is below a fifth temperature, the controller outputs the energization signal to the first adjuster valve to make the flow rate of the fluid passing through the first heat exchanger larger, and when the temperature of the second coolant is above the fifth temperature, the controller stops the energization signal to the first adjuster valve to make the flow rate of the fluid passing through the first heat exchanger smaller than the flow rate when the temperature is below the fifth temperature.

7. The cooling device of the vehicle of claim 3, wherein the first coolant circuit includes a third adjuster valve configured to make, when the temperature of the first coolant is below a third temperature, the flow rate of the first coolant passing through the first heat exchanger smaller than the flow rate when the temperature is above the third temperature, wherein when the temperature of the fluid is below the first temperature and the temperature of the first coolant is above the third temperature, the controller outputs the energization signal to the first adjuster valve to make the flow rate of the fluid passing through the first heat exchanger larger, and wherein when the temperature of the fluid is below the first temperature and the temperature of the first coolant is below the third temperature, the controller stops the energization signal to the first adjuster valve to make the flow rate of the fluid passing through the first heat exchanger smaller than the flow rate when the temperature is above the third temperature.

8. The cooling device of the vehicle of claim 7, wherein the fluid circuit includes a fluid pump for circulation connected to a shaft inside the transmission, and configured to be driven by rotation of the shaft, and wherein the controller stops the energization signal to the first adjuster valve, when the fluid pump is stopped.

9. The cooling device of the vehicle of claim 3, wherein the fluid circuit further includes a second bypass passage bypassing the second heat exchanger, wherein the second adjuster valve is a thermostat valve configured to change a ratio of the flow rate of the fluid passing through the second heat exchanger and a flow rate of the fluid passing through the second bypass passage according to the temperature of the fluid, wherein when the temperature of the fluid is below the first temperature, the second adjuster valve makes the flow rate of the fluid passing through the second heat exchanger smaller, and wherein when the temperature of the fluid is above the first temperature, the controller makes the flow rate of the fluid passing through the second heat exchanger larger than the flow rate when the temperature is below the first temperature.

10. The cooling device of the vehicle of claim 2, wherein the fluid circuit includes a fluid pump for circulation connected to a shaft inside the transmission, and configured to be driven by rotation of the shaft, and wherein the controller stops the energization signal to the first adjuster valve, when the fluid pump is stopped.

11. The cooling device of the vehicle of claim 3, wherein the fluid circuit includes a fluid pump for circulation connected to a shaft inside the transmission, and configured to be driven by rotation of the shaft, and wherein the controller stops the energization signal to the first adjuster valve, when the fluid pump is stopped.

12. The cooling device of the vehicle of claim 4, wherein the fluid circuit includes a fluid pump for circulation connected to a shaft inside the transmission, and configured to be driven by rotation of the shaft, and wherein the controller stops the energization signal to the first adjuster valve, when the fluid pump is stopped.

13. The cooling device of the vehicle of claim 5, wherein the fluid circuit includes a fluid pump for circulation connected to a shaft inside the transmission, and configured to be driven by rotation of the shaft, and wherein the controller stops the energization signal to the first adjuster valve, when the fluid pump is stopped.

14. The cooling device of the vehicle of claim 6, wherein the fluid circuit includes a fluid pump for circulation connected to a shaft inside the transmission, and configured to be driven by rotation of the shaft, and wherein the controller stops the energization signal to the first adjuster valve, when the fluid pump is stopped.

\* \* \* \* \*